(12) United States Patent
Yamaguchi

(10) Patent No.: US 10,397,441 B2
(45) Date of Patent: Aug. 27, 2019

(54) INFORMATION EQUIPMENT MANAGEMENT SYSTEM FOR MANAGING USE APPROVAL/DISAPPROVAL INFORMATION, INFORMATION EQUIPMENT, PERSONAL IDENTIFICATION APPARATUS, AND RECORDING MEDIUM

(71) Applicant: Konica Minolta, Inc., Chiyoda-ku, Tokyo (JP)

(72) Inventor: Takehisa Yamaguchi, Ikoma (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/624,131

(22) Filed: Jun. 15, 2017

(65) Prior Publication Data

US 2017/0366708 A1    Dec. 21, 2017

(30) Foreign Application Priority Data

Jun. 16, 2016   (JP) .................................. 2016-120208

(51) Int. Cl.
*G06F 3/12* (2006.01)
*H04N 1/44* (2006.01)
(Continued)

(52) U.S. Cl.
CPC ......... *H04N 1/442* (2013.01); *H04N 1/00344* (2013.01); *H04N 1/32122* (2013.01);
(Continued)

(58) Field of Classification Search
CPC .. H04N 1/442; H04N 1/4433; H04N 1/32122; H04N 1/00344; H04N 1/4426; G06F 21/32; H04L 9/3231
(Continued)

(56) References Cited

U.S. PATENT DOCUMENTS

2008/0092217 A1* 4/2008 Nagami ............... H04L 9/3271
726/5
2010/0185871 A1* 7/2010 Scherrer ............. G06F 21/6218
713/186
(Continued)

FOREIGN PATENT DOCUMENTS

JP    2006-331120 A    12/2006

*Primary Examiner* — Gabriel I Garcia
(74) *Attorney, Agent, or Firm* — Buchahan Ingersoll & Rooney PC

(57) ABSTRACT

An information equipment management system includes a personal identification apparatus which is portable and capable of acquiring biometric information of a carrying person thereof and thereby identifying the carrying person, an information equipment, and an information equipment management server for managing use approval/disapproval information which is management information on approval or disapproval of use of the information equipment. The personal identification apparatus includes an acquisition part for acquiring use approval/disapproval information of the information equipment relating to the carrying person, which is use approval/disapproval information managed by the information equipment management server, from the information equipment management server and a storage part for storing therein the use approval/disapproval information acquired from the information equipment management server. The information equipment controls an operation of the information equipment by using the use approval/disapproval information stored in the storage part of the personal identification apparatus.

20 Claims, 26 Drawing Sheets

(51) Int. Cl.
*H04N 1/00* (2006.01)
*H04N 1/32* (2006.01)

(52) U.S. Cl.
CPC ......... *H04N 1/4426* (2013.01); *H04N 1/4433* (2013.01); *H04N 2201/0094* (2013.01); *H04N 2201/3202* (2013.01)

(58) Field of Classification Search
USPC ........................................ 358/1.1–1.18, 402
See application file for complete search history.

(56) References Cited

U.S. PATENT DOCUMENTS

| | | | |
|---|---|---|---|
| 2011/0221568 A1* | 9/2011 | Giobbi ................... | G06F 21/32 340/5.82 |
| 2012/0190955 A1* | 7/2012 | Rao ....................... | A61M 5/142 600/368 |
| 2015/0046711 A1* | 2/2015 | Slaby ..................... | H04L 63/08 713/170 |
| 2016/0283176 A1* | 9/2016 | Masuda ............. | H04N 1/00244 |
| 2017/0104890 A1 | 4/2017 | Miyazaki | |
| 2017/0155800 A1* | 6/2017 | Nagasawa ............... | G06F 21/32 |
| 2017/0359180 A1* | 12/2017 | Choi ..................... | H04L 9/3263 |

\* cited by examiner

<PROCESS ON ENTRANCE INTO ROOM>

INFORMATION EQUIPMENT MANAGEMENT SYSTEM FOR MANAGING USE APPROVAL/DISAPPROVAL INFORMATION, INFORMATION EQUIPMENT, PERSONAL IDENTIFICATION APPARATUS, AND RECORDING MEDIUM

The present U.S. patent application claims a priority under the Paris Convention of Japanese patent application No. 2016-120208 filed on Jun. 16, 2016, the entirety of which is incorporated herein by references.

BACKGROUND OF THE INVENTION

Field of the Invention

The present invention relates to a technique for managing an information equipment such as an MFP (Multi-Functional Peripheral) or the like.

Description of the Background Art

There is a technique for managing various management information (authentication information and the like) of an information equipment such as an MFP or the like by an authentication server (information equipment management server) (see Japanese Patent Application Laid Open Gazette No. 2006-331120 (Patent Document 1)). By performing communication between the information equipment and the information equipment management server and using use approval/disapproval information (authorized authentication information or the like) inside the information equipment management server, the information equipment to be managed can be appropriately managed by the information equipment management server.

In an information equipment management system using an information equipment management server, however, communication is caused between the information equipment and the information equipment management server in order to transmit and receive inquiries on whether the information equipment is usable or not, or the like.

When a user U1 logs in, for example, between an information equipment (an MFP or the like) and an information equipment management server, caused is communication including an inquiry on whether the information equipment is usable or not (in detail, an inquiry on user authentication). Particularly, in a situation in which the user U1 repeats logins and logouts, transmission/reception of information on the user authentication is caused relatively frequently between the information equipment and the information equipment management server.

Further, after the login of the user U1 into the MFP, when a copy job is performed by the MFP in response to an operation of the user U1, between the information equipment and the information equipment management server, caused is communication including an inquiry on availability (for example, an inquiry on whether a full-color copy function is usable or not, or the like). Particularly, when a plurality of copy jobs are performed, between the information equipment and the information equipment management server, the inquiry on whether the function is usable or not is caused relatively frequently every time when the copy job is performed.

In such a technique, load concentration sometimes occurs in the information equipment management server as the information equipment management server receives a lot of inquiries, and the like. Further, as a result, a delay in the communication between the information equipment and the information equipment management server sometimes occurs.

SUMMARY OF THE INVENTION

It is an object of the present invention to provide a technique which makes it possible to appropriately manage an information equipment to be managed by an information equipment management server even without always performing communication between the information equipment management server and the information equipment to be managed by the information equipment management server.

The present invention is intended for an information equipment management system. According to a first aspect of the present invention, the information equipment management system comprises a personal identification apparatus which is portable and capable of acquiring biometric information of a carrying person thereof and thereby identifying the carrying person, an information equipment, and an information equipment management server for managing use approval/disapproval information which is management information on approval or disapproval of use of the information equipment, and the information equipment management system of the present invention, the personal identification apparatus comprises an acquisition part for acquiring use approval/disapproval information of the information equipment relating to the carrying person, which is use approval/disapproval information managed by the information equipment management server, from the information equipment management server and a storage part for storing therein the use approval/disapproval information acquired from the information equipment management server, and the information equipment controls an operation of the information equipment by using the use approval/disapproval information stored in the storage part of the personal identification apparatus.

The present invention is also intended for a personal identification apparatus which is portable and capable of acquiring biometric information of a carrying person thereof and thereby identifying the carrying person. According to a second aspect of the present invention, the personal identification apparatus comprises an acquisition part for acquiring use approval/disapproval information of an information equipment relating to the carrying person, which is use approval/disapproval information managed by an information equipment management server, from the information equipment management server, a storage part for storing therein the use approval/disapproval information acquired from the information equipment management server, a determination part for determining approval or disapproval of use of the information equipment by the carrying person, on behalf of the information equipment management server, by using the use approval/disapproval information stored in the storage part of the personal identification apparatus, when an inquiry on whether the information equipment is usable or not by the carrying person is received, and a communication part for transmitting a determination result obtained by the determination part to the information equipment.

The present invention is still also intended for a non-transitory computer-readable recording medium. According to a third aspect of the present invention, the non-transitory computer-readable recording medium records therein a computer program to be executed by a computer embedded in a personal identification apparatus which is portable and capable of acquiring biometric information of a carrying person thereof and thereby identifying the carrying person, to cause the computer to perform the steps of a) acquiring use approval/disapproval information of an information equipment relating to the carrying person, which is use approval/disapproval information managed by an information equipment management server, from the information equipment management server, b) storing the use approval/disapproval information acquired from the information equipment management server, c) determining approval or disapproval of use of the information equipment by the carrying person, on behalf of the information equipment management server, by using the use approval/disapproval information stored in the storage part of the personal identification apparatus, when an inquiry on whether the information equipment is usable or not by the carrying person is received, and d) transmitting a determination result obtained in the step c) to the information equipment.

The present invention is further intended for an information equipment. According to a fourth aspect of the present invention, the information equipment comprises a communication part for transmitting an inquiry on whether the information equipment is usable or not by the carrying person, to a personal identification apparatus which is portable and capable of acquiring biometric information of a carrying person thereof and thereby identifying the carrying person and an operation control part for controlling an operation of the information equipment on the basis of a determination result using use approval/disapproval information stored in the personal identification apparatus, which is a determination result received from the personal identification apparatus which functions as a proxy server of an information equipment management server.

According to a fifth aspect of the present invention, the non-transitory computer-readable recording medium records therein a computer program to be executed by a computer embedded in an information equipment, to cause the computer to perform the steps of a) transmitting an inquiry on whether the information equipment is usable or not by the carrying person, to a personal identification apparatus which is portable and capable of acquiring biometric information of a carrying person thereof and thereby identifying the carrying person and b) controlling an operation of the information equipment on the basis of a determination result using use approval/disapproval information stored in the personal identification apparatus, which is a determination result received from the personal identification apparatus which functions as a proxy server of an information equipment management server.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings. However, the scope of the invention is not limited to the illustrated examples.

<1. The First Preferred Embodiment>
<1-1. Overall Configuration>

Figure 1:
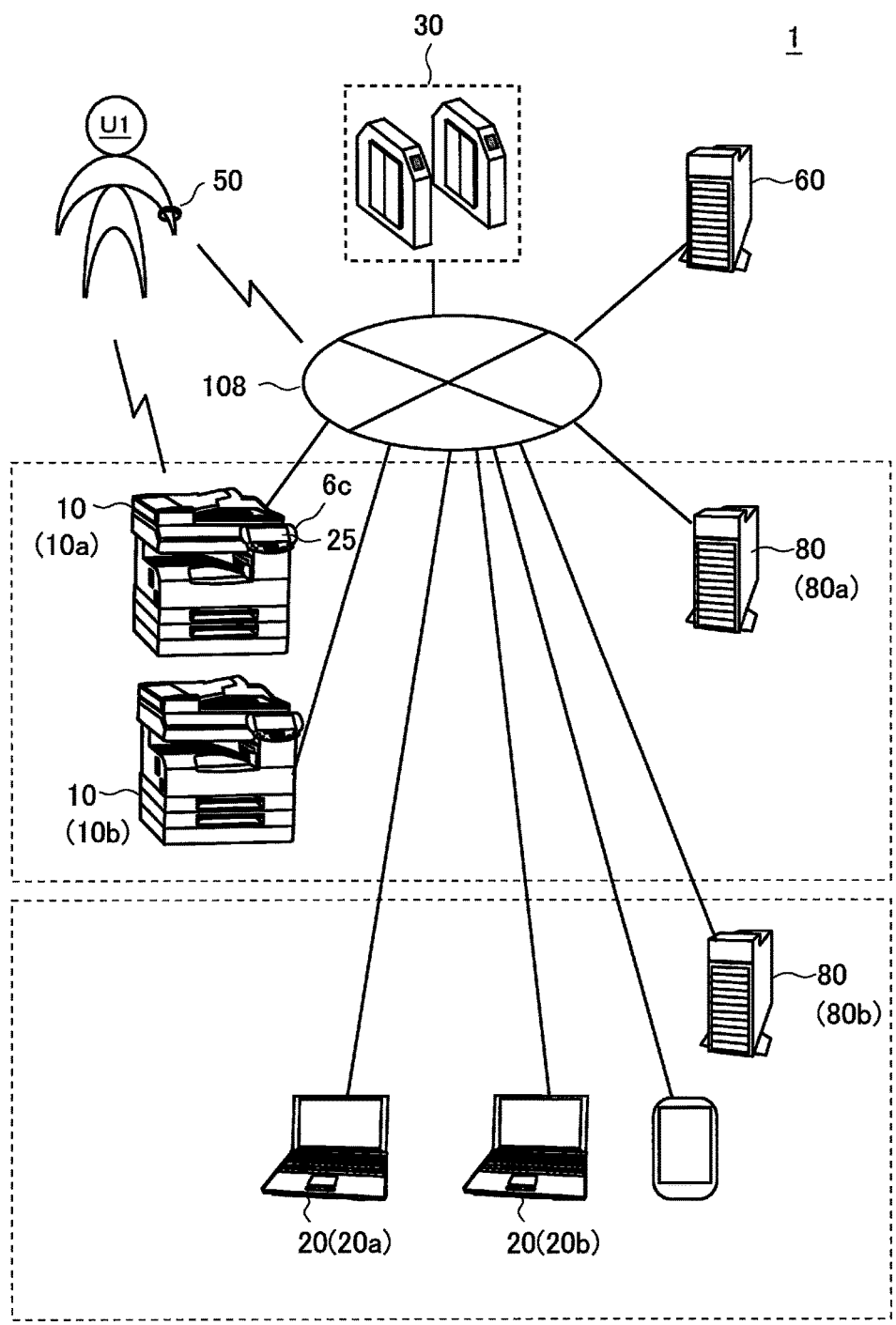
FIG. 1 is a view showing an information equipment management system.

FIG. 1 is a view showing an information equipment management system 1 in accordance with the present invention. As shown in FIG. 1, the information equipment management system 1 comprises a plurality of information equipments and a plurality of information equipment management server computers (hereinafter, also referred to simply as "servers") 80 (80a and 80b). As the plurality of information equipments, exemplarily shown are a plurality of MFPs (Multi-Functional Peripherals) 10, a plurality of personal computers 20, and the like. Further, the plurality of information equipment management servers 80 include an information equipment management server 80 (80a) which manages the plurality of MFPs 10 and an information equipment management server 80 (80b) which manages the plurality of personal computers 20 (and mobile data terminals and the like).

The information equipment management server 80a stores therein respective management information (equipment management information) of the plurality of information equipments and manages an operation of each information equipment, or the like, by using the equipment management information (use approval/disapproval information (described later) and the like). Specifically, the information equipment management server 80a stores therein respective management information (equipment management information) of the plurality of MFPs 10 and manages an operation of each MFP 10 by using the equipment management information (use approval/disapproval information and the like). Similarly, the information equipment management server 80b stores therein respective management information (equipment management information) of the plurality of personal computers 20 and the like and manages an operation of each personal computer 20, or the like, by using the equipment management information (use approval/disapproval information and the like).

Herein, the management information of an information equipment includes use approval/disapproval information (also referred to as use approval/disapproval management information) which is management information on approval or disapproval of use of the information equipment (by each user). The use approval/disapproval information is also referred to as information to determine approval or disapproval of use of the information equipment by each user.

The use approval/disapproval information includes, first, basic management information on approval or disapproval of use of the information equipment (by each user), and more specifically, basic information (primary use approval/disapproval information, so-called "authentication information") on approval or disapproval of use of the information equipment (apparatus) itself (comprehensive use of the information equipment). The "authentication information", for example, specifies whether or not a user U1 has the authority to use the MFP 10. Herein, an "authentication process" is also referred to as a process to determine primary (basic) approval or disapproval of use of the information equipment, and the "authentication information" is also referred to as information (primary use approval/disapproval information) used to determine primary approval or disapproval of use of the information equipment.

Further, the use approval/disapproval information includes detailed management information (more specifically, information (secondary use approval/disapproval information) other than the "authentication information") on approval or disapproval of use of the information equipment (specific use of the information equipment) (by each user) after the authentication. The detailed management information is also referred to as information (secondary use approval/disapproval information or secondary information) used to determine secondary approval or disapproval of use of the information equipment after the authentication process. Furthermore, the detailed management information is still also referred to as information (detailed use approval/disapproval information or simply detailed information) used to determine secondary approval or disapproval of use (detailed use approval/disapproval) which is approval or disapproval of use that is more detailed than the approval or disapproval of comprehensive use of the information equipment, which is determined by the "authentication process", or the like. The detailed management information (secondary use approval/disapproval information) includes, for example, "function use approval/disapproval information" relating to each user and "usage amount limitation information" relating to each user. Further, the detailed management information (especially, the use approval/disapproval information (detailed management information) on the personal computer 20) includes "program use approval/disapproval information" (information on whether each program is under license or not) relating to each user, or the like. Herein, the "function use approval/disapproval information" is information on approval or disapproval of use of each function of the information equipment (disapproval or disapproval of use of the color printing function, approval or disapproval of use of the function of accessing a box, and the like) and is also referred to as "execution approval/disapproval information". Furthermore, the "usage amount limitation information" is information (allowable usage amount information, (specifically, the upper limit value of the number of printed sheets ("500" pieces per month) and/or the number of remaining printable sheets (e.g., "200" pieces left until the end of the month)) on limitation of the amount of usage of the information equipment (the amount of usage of consumable item).

Each information equipment management server 80 manages the use approval/disapproval information (use approval/disapproval management information) which is management information on approval or disapproval of use of the corresponding information equipment.

Further, use history information (log information) of the apparatus is stored in the MFP 10 independently of the equipment management information or as part of the equipment management information.

Each information equipment management server 80 manages the use history information (log information) which is management information on use history of the corresponding information equipment.

The information equipment management system 1 further comprises a personal identification apparatus 50. The personal identification apparatus 50 is an apparatus (portable-type apparatus) for personal identification, which acquires biometric information of a carrying person (also referred to as a holder, a wearer, a person who takes the personal identification apparatus 50, or the like) thereof and thereby identifies the carrying person. The personal identification apparatus 50 is also referred to as a mobile ID terminal, a portable-type personal identification terminal, or the like. The personal identification apparatus 50 detects the biometric information (for example, a pulse wave or the like) of the person wearing this apparatus and thereby specifies (identifies) the wearer (person). For example, the personal identification apparatus 50 can identify the wearer as a specific person (user U1).

Further, the information equipment management system 1 further comprises a room entrance/exit management apparatus 30 and a room entrance/exit management server 60. The room entrance/exit management apparatus 30 and the room entrance/exit management server 60 constitute a room entrance/exit management system. In other words, the information equipment management system 1 comprises the room entrance/exit management system as a subsystem.

The room entrance/exit management apparatus 30 manages entrance and exit of each user to/from a room (office room) 100, and is also referred to as a security gate apparatus or the like. The room entrance/exit management apparatus 30 is disposed at a gateway of the room 100 (see FIG. 4) and manages the entrance and exit of each user to/from the room 100. In more detail, when a person who goes through a gate (provided at the room entrance/exit management apparatus 30) is not permitted to enter the room, a no-entry bar is projected into the gate (in detail, into the path through which the person goes), to thereby block (inhibit) the passage of the person. On the other hand, when the person who goes through the gate is permitted to enter the room, the no-entry bar is retracted from the path and the passage of the person is not blocked.

Further, the room entrance/exit management server 60 is a server for managing the room entrance/exit management apparatus 30. The room entrance/exit management server 60 stores therein management information (room entrance/exit management information) on the entrance and exit of a plurality of users, and determines whether each user is permitted to enter the room or not, and the like, by using the room entrance/exit management information, and manages an operation and the like of the room entrance/exit management apparatus 30.

The constituent elements 10, 20, 30, 50, 60, and 80 in the information equipment management system 1 are communicably connected to one another via a network 108. The network 108 includes a LAN (Local Area Network), the internet, and the like. The connection to the network 108 may be wired or wireless.

Further, the information equipments (the MFPs 10, the personal computers 20, and the like) are wireless connected to the personal identification apparatus 50 by using various wireless communication technologies. For the communication between the MFP 10 and the personal identification apparatus 50, for example, the communication in accordance with the wireless LAN (IEEE 802.11 or the like) and the short-range wireless communication can be used. As the short-range wireless communication, for example, used are the communication in accordance with the Bluetooth LE (Bluetooth Low Energy) ("Bluetooth" is a registered trademark) or an NFC (Near Field Communication) or the like.

Figure 4:
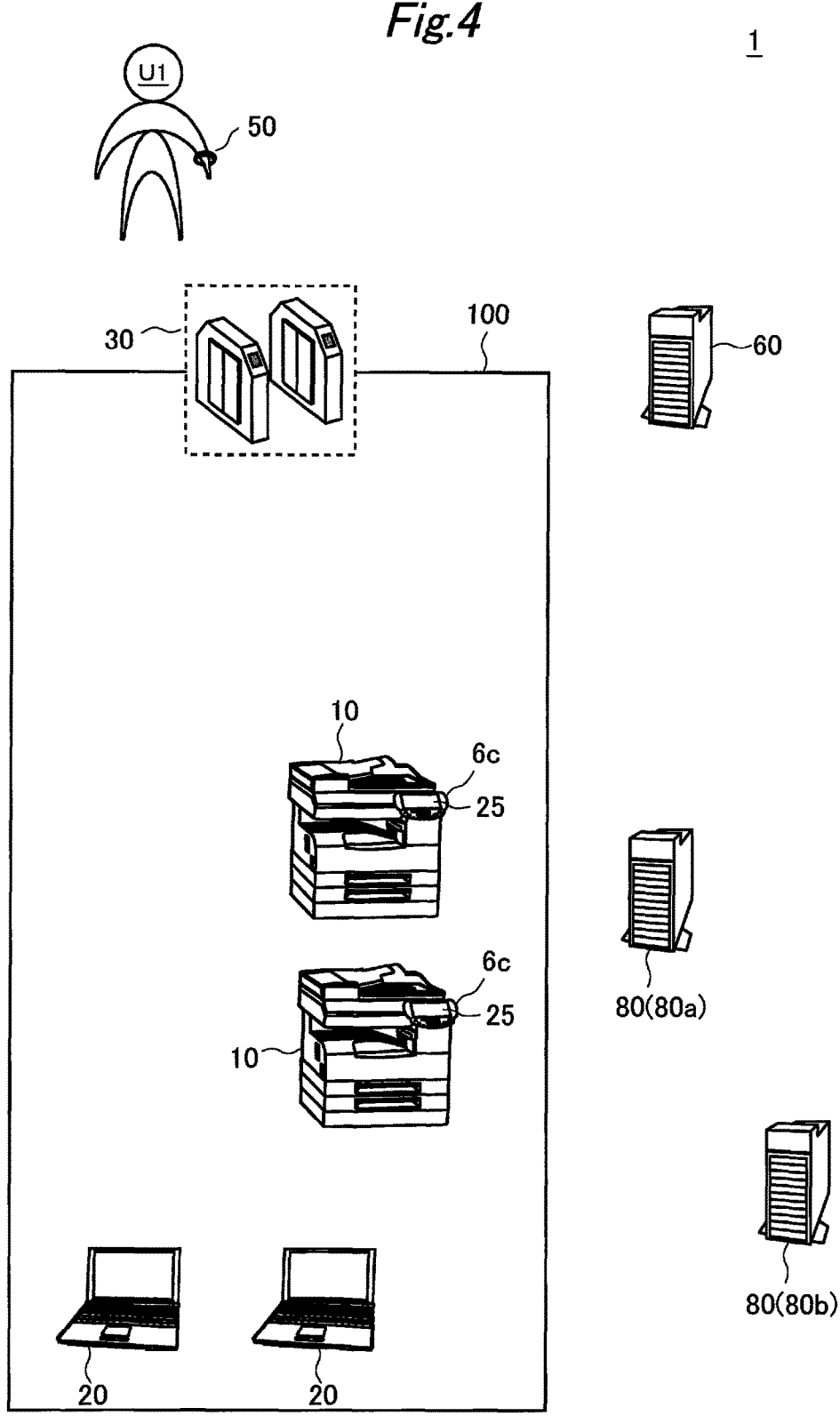
FIG. 4 is a view showing a state in which a plurality of information equipments are disposed inside a room.

Furthermore, in the information equipment management system 1, the plurality of information equipments (the plurality of MFPs 10, the plurality of personal computers 20, and the like) are disposed inside the room 100 (see FIG. 4). Moreover, as described above, at the gateway of the room 100, disposed is the room entrance/exit management apparatus 30. Further, the room entrance/exit management server 60 and the information equipment management server 80 may be disposed inside the room 100 or outside the room 100 (inside another room other than the room 100, or the like).

<1-2. Constitution of MFP>

Figure 2:
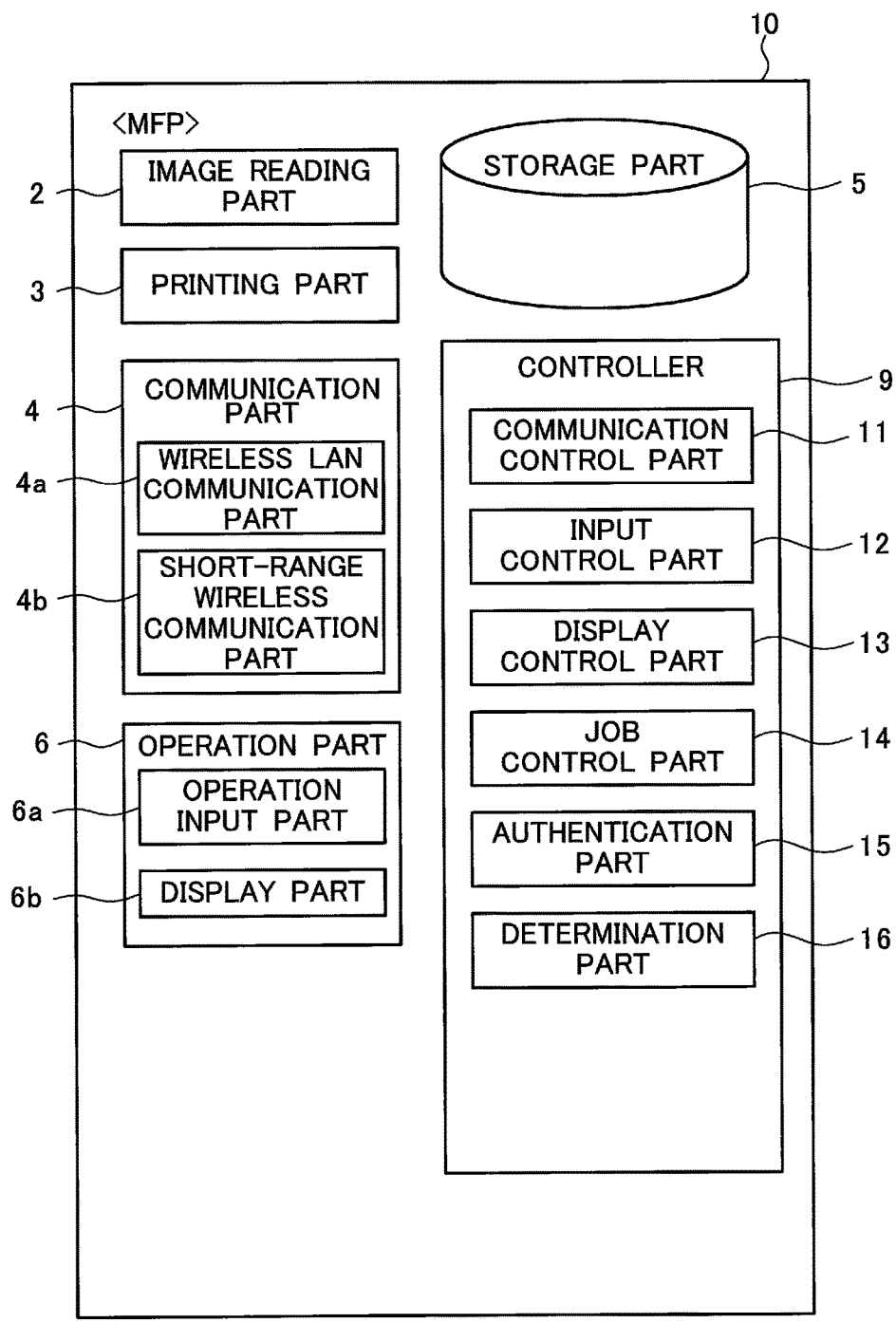
FIG. 2 is a view showing functional blocks of an MFP.

FIG. 2 is a view showing functional blocks of the MFP (Multi-Functional Peripheral) 10. The MFP 10 is an example of an information equipment. Further, the MFP 10 is also referred to as an image forming apparatus, an information processing apparatus, or the like.

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an operation part 6, a controller 9, and the like, and multiply uses these constituent parts to implement various functions.

The image reading part 2 is a processing part which optically reads (in other words, scans) an original manuscript placed on a predetermined position (ADF (Auto Document Feeder), a glass surface, or the like) of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing various wireless communications. Specifically, the communication part 4 comprises a wireless LAN communication part 4a for performing wireless communication in accordance with the wireless LAN (IEEE 802.11 or the like) and a short-range wireless communication part 4b for performing wireless communication (short-range wireless communication) in accordance with the Bluetooth LE or the like.

The storage part 5 is a storage unit such as a hard disk drive (HDD) or/and the like.

The operation part 6 comprises an operation input part 6a for receiving an operation input which is given to the MFP 10 and a display part 6b for displaying various information thereon.

The MFP 10 is provided with a substantially plate-like operation panel part 6c (see FIG. 1). The operation panel part 6c has a touch panel 25 (see FIG. 1) on a front surface side thereof. The touch panel 25 serves as part of the operation input part 6a and also serves as part of the display part 6b. The touch panel 25 is a liquid crystal display panel in which various sensors or the like are embedded, and capable of displaying various information thereon and receiving various operation inputs from the operating user.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a program) stored in the ROM (e.g., EEPROM (registered trademark)), to thereby implement various processing parts. Further, the program (in more detail, a group of program modules) may be recorded in one of various portable recording media (in other words, various non-transitory computer-readable recording media), such as a USB memory or the like, and read out from the recording medium to be installed in the MFP 10. Alternatively, the program may be downloaded via a network to be installed in the MFP 10.

Specifically, as shown in FIG. 2, the controller 9 executes the above-described program, to thereby implement various processing parts including a communication control part 11, an input control part 12, a display control part 13, a job control part 14, an authentication part 15, and a determination part 16.

The communication control part 11 is a processing part for controlling communication with other apparatus(es) (a wearable terminal 50 or/and the like) in cooperation with the communication part 4 and the like. The communication control part 11 has a transmission control part for controlling a transmitting operation of various data and a reception control part for controlling a receiving operation of various data.

The input control part 12 is a control part for controlling an operation inputting operation to the operation input part 6a (the touch panel 25 or the like). For example, the input control part 12 controls an operation for receiving an operation input (a specification input from a user, or the like) to an operation screen displayed on the touch panel 25.

The display control part 13 is a processing part for controlling a display operation on the display part 6b (the touch panel 25 or the like). The display control part 13 displays the operation screen or the like for operating the MFP 10 on the touch panel 25.

The job control part 14 is a processing part for controlling operations on various jobs (printing operation, image reading operation, and the like).

The authentication part 15 is a processing part for controlling an authentication process (login process) of a user.

The job control part 14 and the authentication part 15 are also each referred to as an operation control part for controlling the operation of the MFP 10 on the basis of a determination result on approval or disapproval of use of the MFP 10 (by each user). The operation control part is a processing part for controlling the operation of the MFP 10 on the basis of the determination result using the use approval/disapproval information stored in the personal identification apparatus 50 (the determination result received from the personal identification apparatus 50 which functions as a proxy server of the information equipment management server 80) or the like.

The determination part 16 is a processing part for determining whether or not the use approval/disapproval information is stored in the personal identification apparatus 50.

<1-3. Constitution of Personal Identification Apparatus 50>

Next, a constitution of the personal identification apparatus 50 will be described. Herein, as the personal identification apparatus 50, exemplarily shown is the wearable terminal (also referred to as a wearable device).

The wearable terminal 50 is a device which is capable of performing a cooperative operation with the MFP (information processing apparatus) 10. Specifically, the wearable terminal 50 is an information input/output terminal device (information terminal) capable of performing wireless communication (short-range wireless communication and network communication) with the MFP 10.

The wearable terminal 50 is a biometric information detection device for detecting (measuring) biometric information of a user. Herein, as the wearable terminal 50, exemplarily shown is a device capable of detecting (measuring) biometric information (pulse wave, heart rhythm, body temperature, heart rate, and/or the like) of the user. The biometric information is used to distinguish users from one another.

Herein, as the wearable terminal (personal identification apparatus) 50, exemplarily shown is a wristband-type (wrist-wearable type) device. This is, however, only one exemplary type and various types of devices may be used as the wearable terminal 50.

Figure 3:
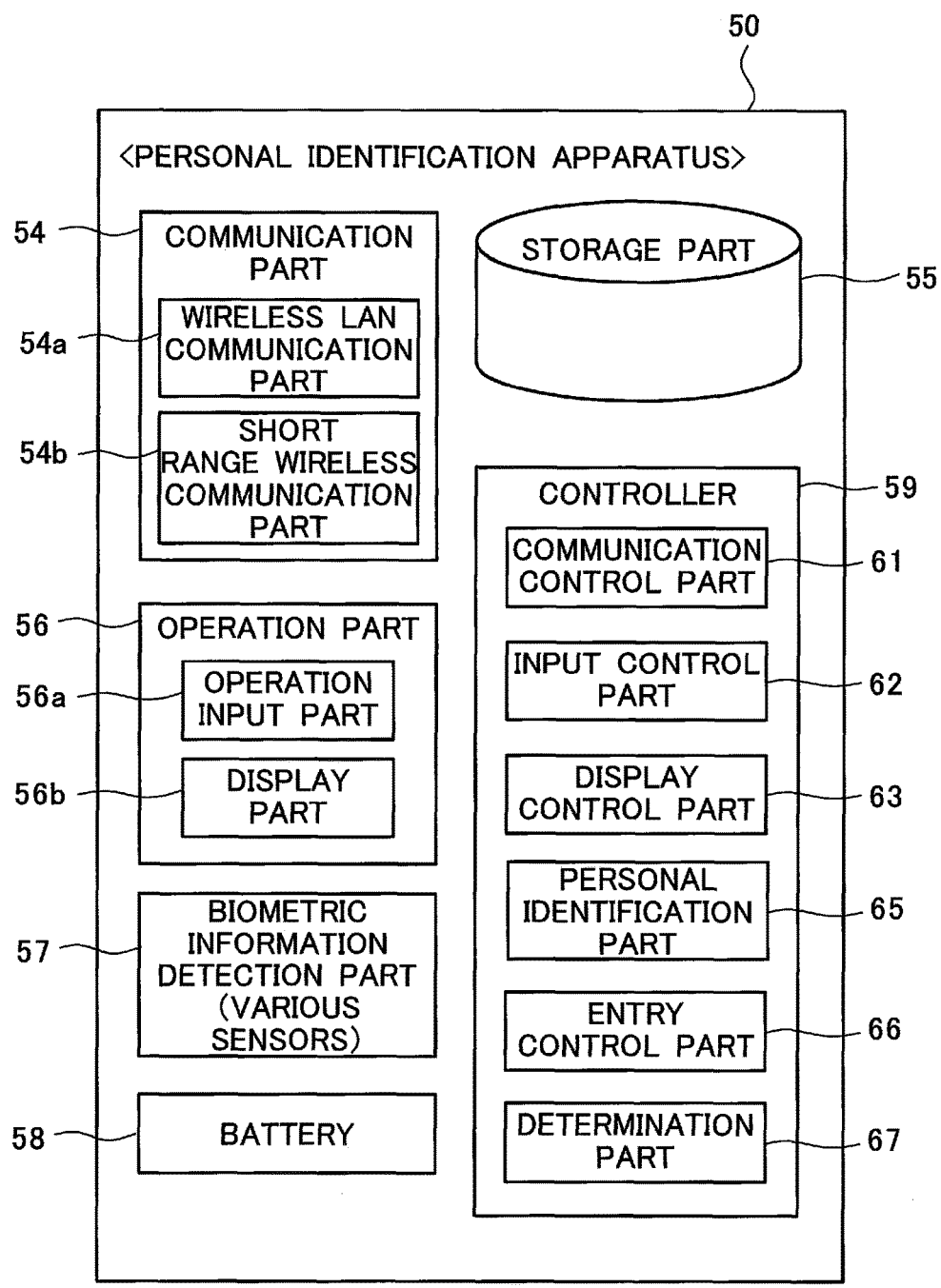
FIG. 3 is a functional block diagram showing a schematic constitution of a personal identification apparatus.

FIG. 3 is a functional block diagram showing a schematic constitution of the wearable terminal 50.

As shown in the functional block diagram of FIG. 3, the wearable terminal 50 comprises a communication part 54, a storage part 55, a biometric information detection part 57, a battery 58, a controller 59, and the like and multiply uses these constituent parts to implement various functions.

The communication part 54 is capable of performing various wireless communications (including wireless communication in accordance with the Bluetooth LE or the like, and the like). Specifically, the communication part 54 comprises a wireless LAN communication part 54a for performing wireless communication in accordance with the wireless LAN (IEEE 802.11 or the like) and a short-range wireless communication part 54b for performing wireless communication (short-range wireless communication) in accordance with the Bluetooth LE or the like.

The storage part 55 is a storage unit such as a nonvolatile semiconductor memory or the like.

The biometric information detection part 57 includes various sensors for detecting the biometric information such as pulse wave and the like.

The battery 58 is a secondary battery and supplies power to the wearable terminal 50.

The operation part 56 comprises an operation input part 56a for receiving an operation input which is given to the wearable terminal 50 and a display part 56b for displaying various information thereon. The wearable terminal 50 is provided with a touch panel which is a liquid crystal display panel in which various sensors or the like are embedded. The touch panel serves as part of the operation input part 56a and also serves as part of the display part 56b.

The controller 59 shown in FIG. 3 is a control unit for generally controlling the wearable terminal 50. The controller 59 is a computer system which is embedded in the wearable terminal 50 and comprises a CPU, various semiconductor memories (RAM and ROM), and the like. The controller 59 causes the CPU to execute a predetermined software program (program) stored in a memory part (such as a semiconductor memory or the like), to thereby implement various processing parts. Further, the program (in more detail, a group of program modules) may be recorded in one of various portable recording media (in other words, various non-transitory computer readable recording media), such as a USB memory or the like, and read out from the recording medium to be installed in the wearable terminal 50. Alternatively, the program may be downloaded via a network or the like to be installed in the wearable terminal 50.

In the wearable terminal 50, installed is a program (cooperation program) for performing cooperation with various information equipments (the MFPs 10 and the like), or the like. The cooperation program is an application software program (also referred to simply as application) for performing various processes (a process of detecting a state (biometric information) of the user and identifying the user, a process of transmitting information of the identified person to the information equipments which are communication partners or the like, and the like).

Specifically, the controller 59 executes the cooperation program or the like, to thereby implement various processing parts including a communication control part 61, an input control part 62, a display control part 63, a personal identification part 65, an entry control part 66, and a determination part 67.

The communication control part 61 is a processing part for controlling communication with the MFPs 10 and the like in cooperation with the communication part 54 and the like.

The input control part 62 is a control part for controlling an operation inputting operation to the operation input part 56a (the touch panel or the like).

The display control part 63 is a processing part for controlling a display operation on the display part 56b (the touch panel and the like).

The personal identification part 65 is a processing part for performing an analysis process or the like, on the basis of the biometric information (pulse wave information and the like) detected by the biometric information detection part 57, to thereby identify the person.

The entry control part 66 is a processing part for acquiring the use approval/disapproval information of each information equipment (use approval/disapproval information managed by the corresponding information equipment management server 80) from the corresponding information equipment management server 80 and controlling an operation of making an entry of the use approval/disapproval information acquired from the information equipment management server 80 into the storage part 55. Further, the entry control part 66 also controls an operation of deleting the use approval/disapproval information from the storage part 55, and the like.

The determination part 67 is a processing part for determining approval or disapproval of use of each information equipment, on behalf of the information equipment management server 80, by using the use approval/disapproval information stored in the personal identification apparatus 50 when the determination part 67 receives an inquiry on the approval or disapproval of use of the information equipment from the information equipment.

<1-4. Overall Operation>

Figure 5:
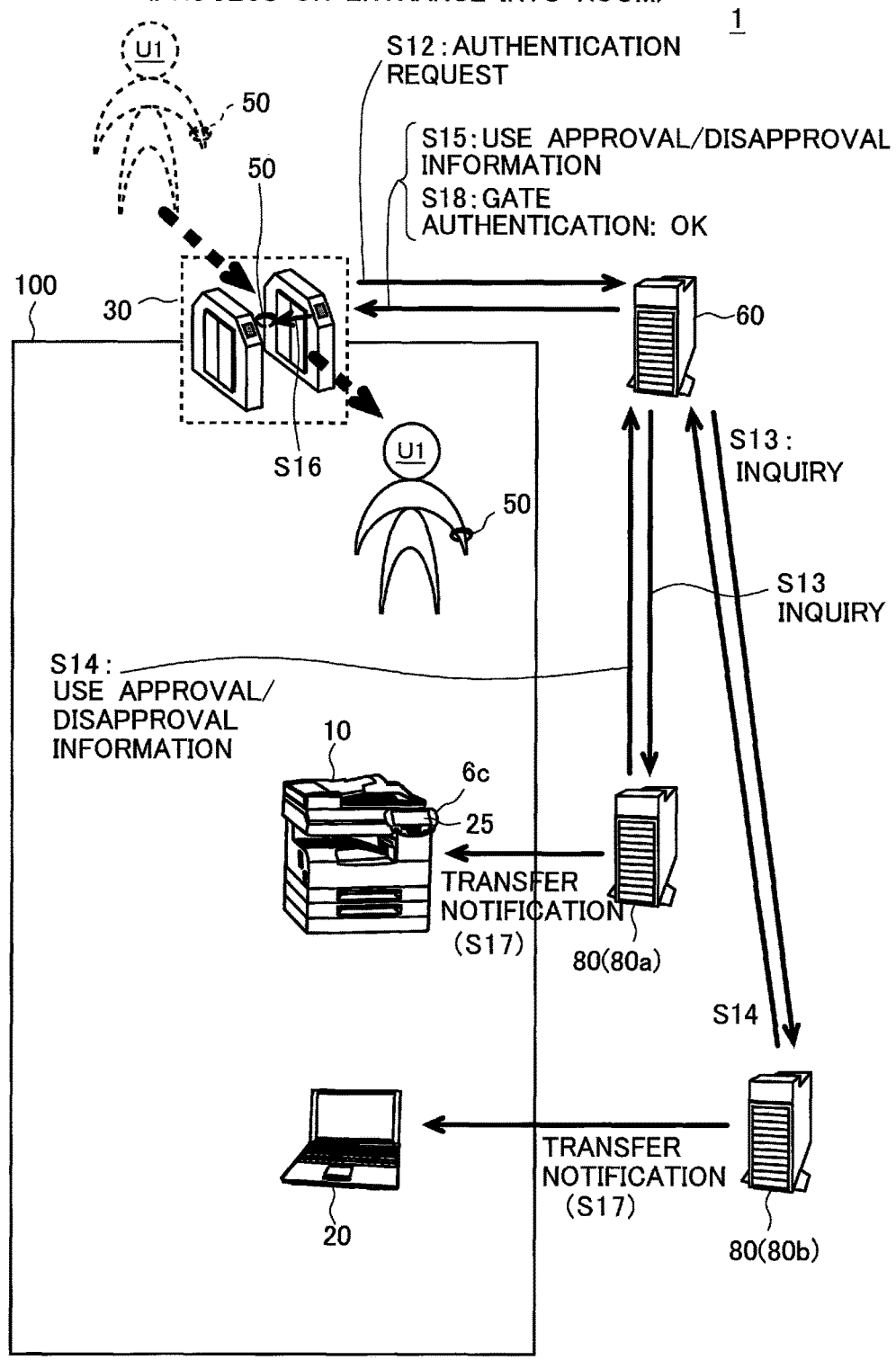
FIGS. 5 to 10 are views each showing an operation in the information equipment management system.

In the present first preferred embodiment, when the user U1 enters the room 100 through the room entrance/exit management apparatus 30, all the pieces of use approval/disapproval information (only the use approval/disapproval information relating to the user U1, however) relating to the plurality of MFPs 10 and personal computers 20 which are present inside the room 100 are transmitted from the information equipment management servers 80 to the personal identification apparatus 50, respectively, and stored into the personal identification apparatus 50 (see FIG. 5).

After that, the use approval/disapproval information (in detail, the use approval/disapproval information relating to the user U1) is managed by the personal identification apparatus 50 (the personal identification apparatus 50 worn by the user U1) (alternatively managed by the personal identification apparatus 50), instead of the e information equipment management server 80. In other words, the use approval/disapproval information and the like for the user U1 are transferred from the information equipment management server 80 to the personal identification apparatus 50. More specifically, as the use approval/disapproval information for the user U1, the information inside the personal identification apparatus 50 (instead of the information inside the information equipment management server 80) is used and the approval or disapproval of use of each information equipment is determined. Then, on the basis of the determination result, the operation of the information equipment is controlled (see FIGS. 6 to 9).

Such an alternative management state (the state in which the management on the approval or disapproval of use of the information equipment is transferred from the information equipment management server 80 to the personal identification apparatus 50) continues until the user U1 exits the room 100. Specifically, when the user U1 exits the room 100, the use approval/disapproval information is deleted from the personal identification apparatus 50 and the alternative management is ended (see FIG. 10 and the like).

Further, as described later, the use history information (log information) relating to each information equipment, and the like, are stored in the personal identification apparatus 50 during the transfer period (during the alternative management of the management information by the personal identification apparatus 50). Then, when the transfer period is ended, the use history information and the like are transmitted from the personal identification apparatus 50 to the information equipment management server 80 and written into each information equipment management server 80.

Hereinafter, detailed description will be made on such an aspect.

<1-5. Detailed Operation>
<Operation on Entrance into Room>

Figure 10:
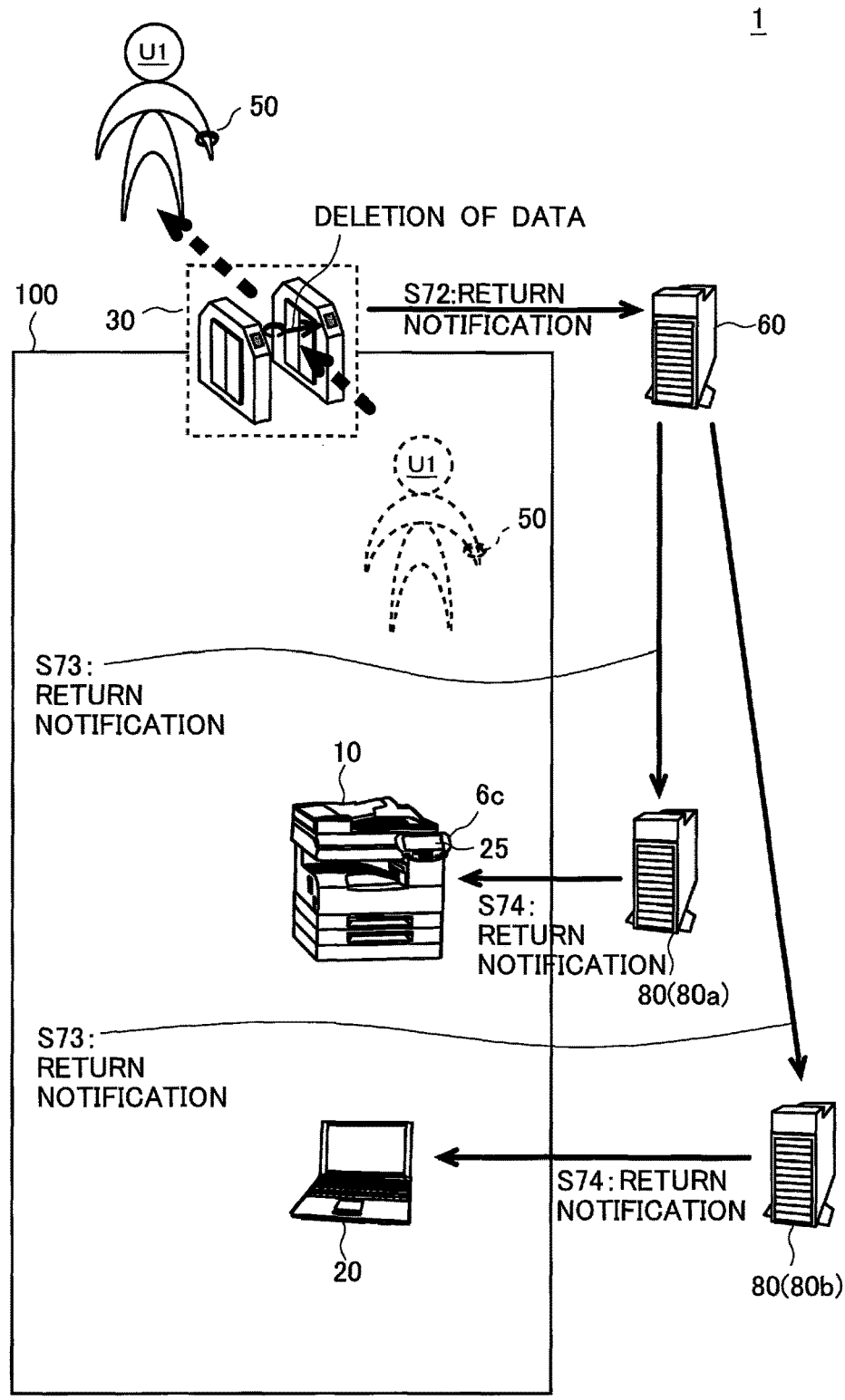
Figure 11:
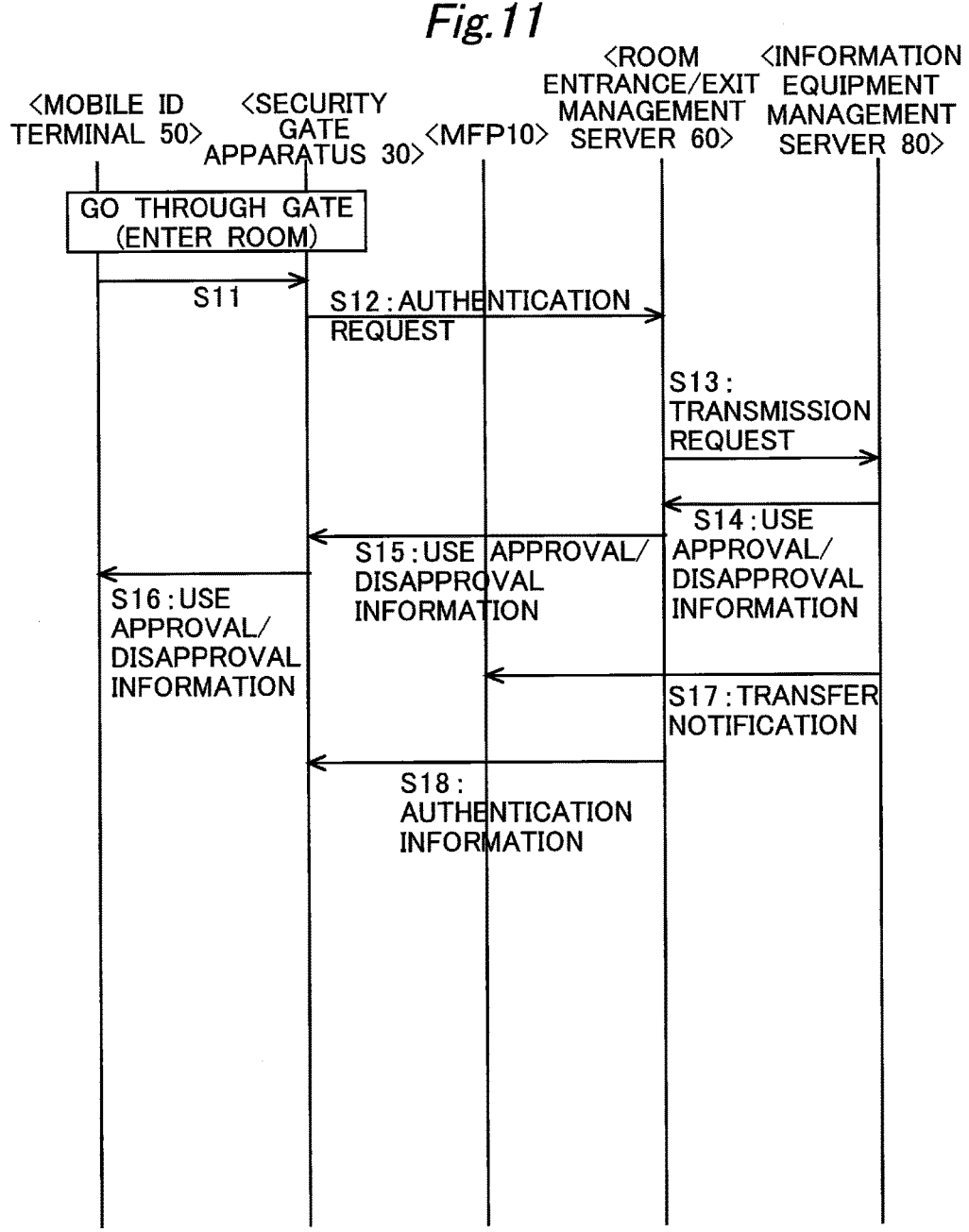
FIGS. 11 to 13 are timing charts each showing the operation in the information equipment management system.
Figure 12:
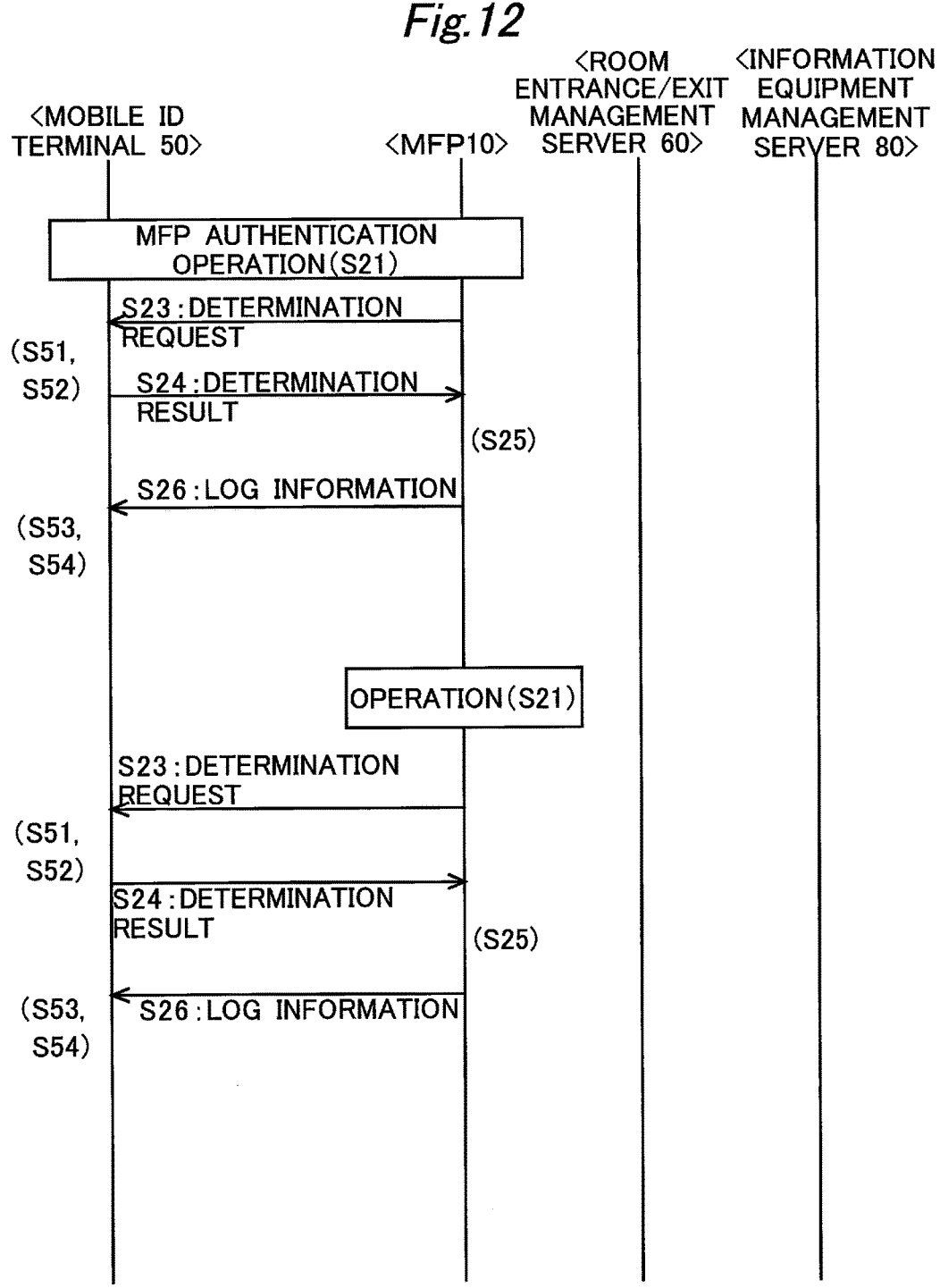
Figure 13:
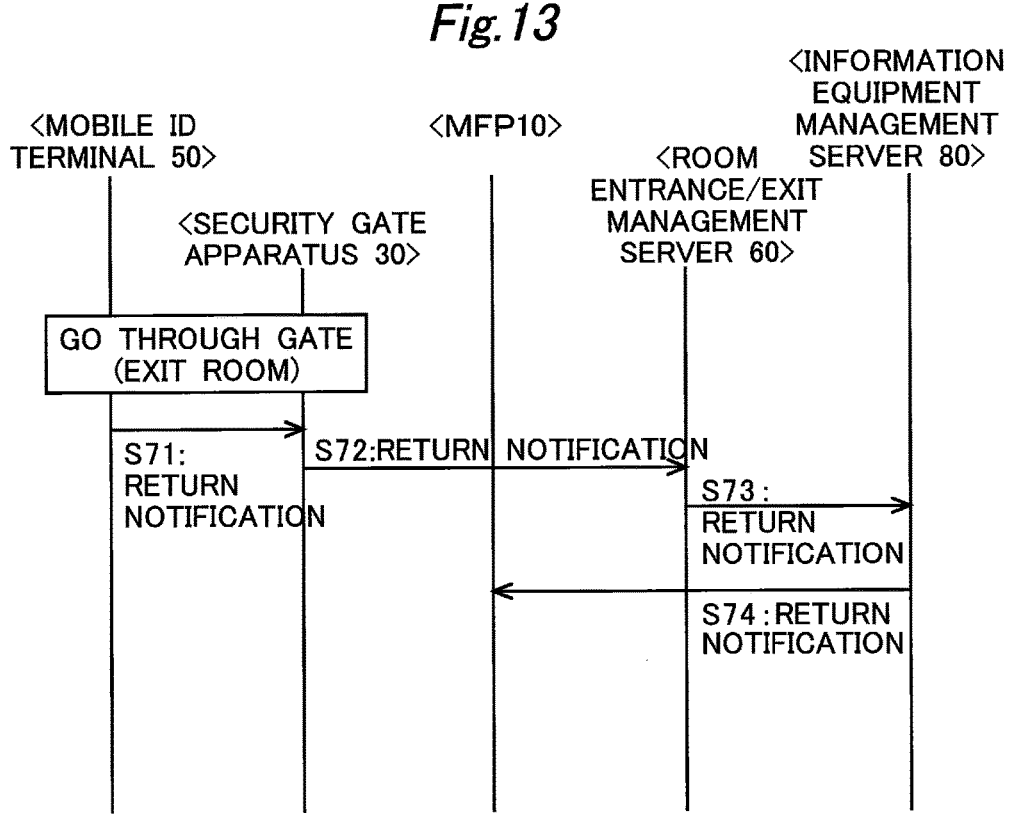
Figure 14:
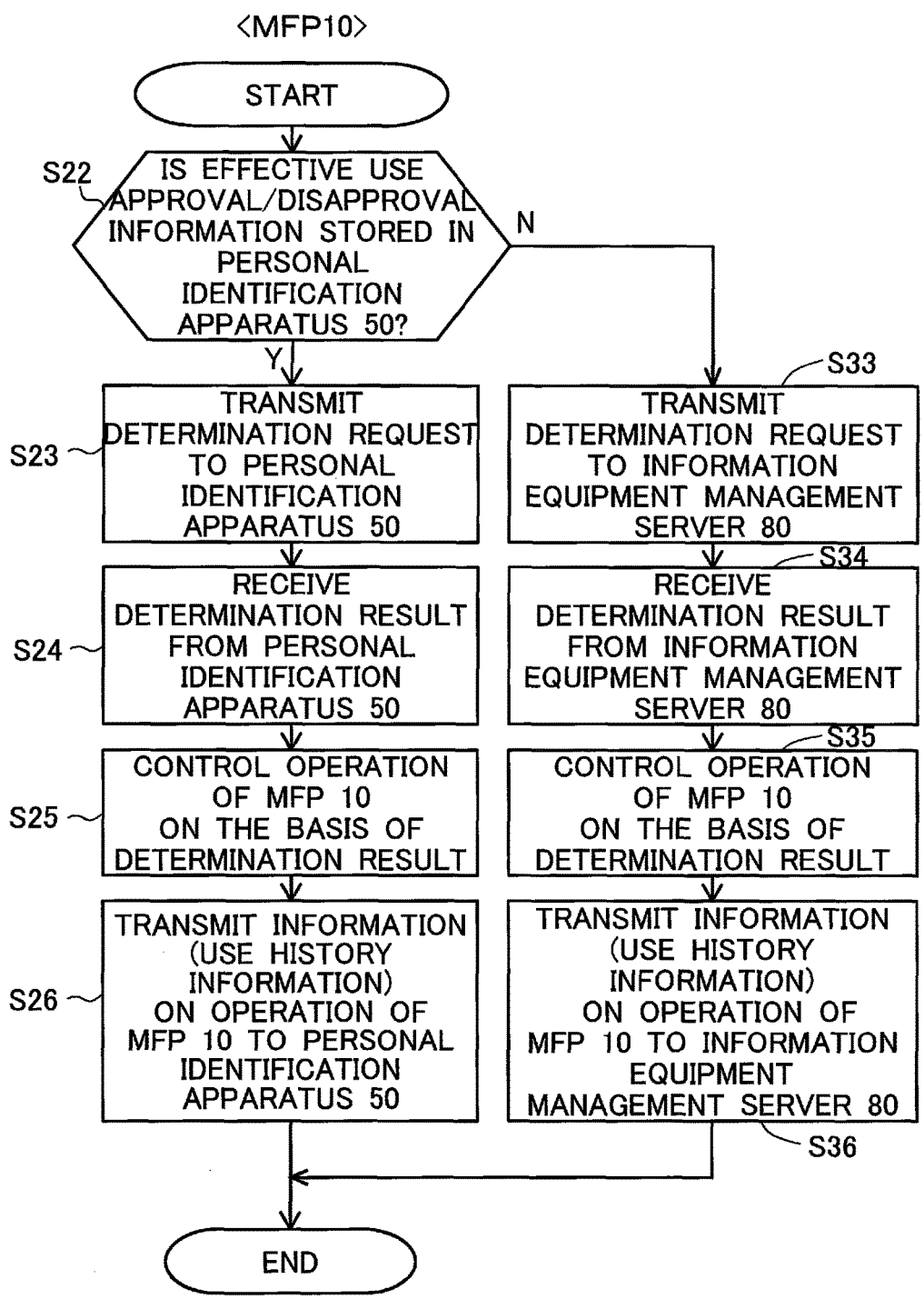
FIG. 14 is a flowchart showing an operation of the MFP.
Figure 15:
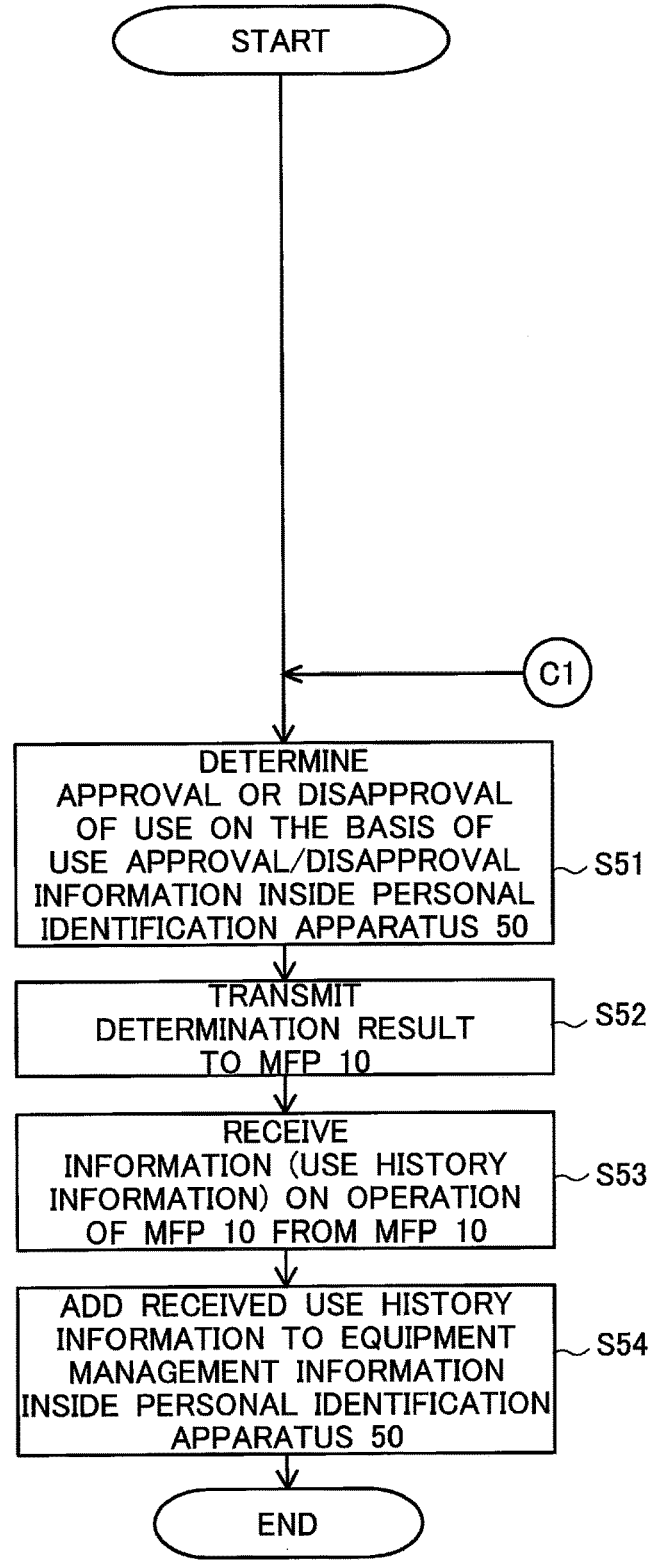
FIG. 15 is a flowchart showing an operation of the personal identification apparatus.

FIGS. 5 to 10 are conceptual diagrams each showing an operation in the information equipment management system 1. FIGS. 11 to 13 are timing charts each showing the operation in the information equipment management system 1. FIG. 14 is a flowchart showing an operation of the MFP 10, and FIG. 15 is a flowchart showing an operation of the personal identification apparatus 50.

The personal identification apparatus 50 is capable of identifying a person (user) who wears the self-apparatus by acquiring biometric information (pulse wave and the like) of the person and analyzing the biometric information. Herein, it is assumed that the user U1 already wears the personal identification apparatus 50 before the user U1 enters the room 100, and the personal identification apparatus 50 already identifies the person wearing the personal identification apparatus 50 as a specific user U1.

After that, as shown in FIG. 11, in Step S11, when the user U1 goes through the room entrance/exit management apparatus 30 and enters the room (also see FIG. 5), the personal identification apparatus 50 worn by the user U1 performs communication (wireless communication) with the room entrance/exit management apparatus 30. Further, the communication may be wireless communication (short-range wireless communication or wireless LAN communication) or the like.

Specifically, the personal identification apparatus 50 transmits the room entrance permission request of the user U1 to the room entrance/exit management apparatus 30. The room entrance/exit management apparatus 30 transfers the room entrance permission request to the room entrance/exit management server 60 (Step S12 (also see FIG. 5)).

In response to the room entrance permission request of the user U1, the room entrance/exit management server 60 determines whether to permit the user U1 to enter the room. In more detail, the room entrance/exit management server 60 determines whether to permit the user U1 to enter the room, on the basis of the room entrance/exit management information (information specifying whether to permit each of a plurality of users to enter the room, and the like) inside the room entrance/exit management server 60.

Then, the room entrance/exit management server 60 notifies (transmits) the determination result (determination result on approval or disapproval) to the room entrance/exit management apparatus 30 (Step S18), and the room entrance/exit management apparatus 30 executes an operation based on the determination result. For example, when the room entrance/exit management information specifies that the user U1 should be permitted to enter the room, the user U1 is permitted to enter the room. Then, the room entrance/exit management apparatus 30 retracts the no-entry bar. The user U1 can thereby go through the room entrance/exit management apparatus 30.

In the first preferred embodiment, however, before the process of Step S18, the room entrance/exit management server 60 collects and acquires respective use approval/disapproval information of the plurality of information equipments (the MFPs 10, the personal computers 20, and the like) disposed inside the room 100, from the plurality of information equipment management servers 80 for management relating to the plurality of information equipments. In more detail, the respective use approval/disapproval information of the plurality of information equipments are the use approval/disapproval information relating to the user U1 who is confirmed to enter the room 100 by the room entrance/exit management apparatus 30. Then, the room entrance/exit management server 60 transfers the plurality of pieces of use approval/disapproval information acquired from the plurality of information equipment management servers 80 to the personal identification apparatus 50 via the room entrance/exit management apparatus 30 (Steps S13 to S16).

Specifically, the room entrance/exit management server 60 acquires the respective use approval/disapproval information relating to the plurality of information equipments disposed inside the room 100, on the basis of a list (also referred to as a "device list") of the information equipments disposed inside the room 100. The device list is data specifying the plurality of information equipments disposed inside the room 100 and the information equipment management servers 80 corresponding to the plurality of information equipments, respectively. For example, the device list specifies that "the MFPs 10 (10*a*, 10*b*, 10*c*, . . . ) inside the MFP 10 are managed by the information equipment management server 80*a*, and the personal computers 20 (20*a*, 20*b*, 20*c*, . . . ) inside the room 100 are managed by the information equipment management server 80*b*".

In detail, first, the room entrance/exit management server 60 determines each of the information equipment management servers 80 (80*a* and 80*b*) as an acquisition source of the data on the basis of the device list, and transmits a transmission request of the use approval/disapproval information to the information equipment management server 80 to require the use approval/disapproval information (Step S13 (see FIGS. 5 and 11)). More specifically, the room entrance/exit management server 60 requires the information equipment management server 80*a* to give the use approval/ disapproval information of the information equipments (the MFPs 10) under the control thereof. Further, the room entrance/exit management server 60 requires the information equipment management server 80*b* to give the use approval/disapproval information of the information equipments (personal computers 20) under the control thereof.

In response to the respective requests, the information equipment management servers 80*a* and 80*b* transmit the respective use approval/disapproval information of the information equipments to the room entrance/exit management server 60 (Step S14). When the room entrance/exit management server 60 receives the respective (latest) use approval/disapproval information from the information equipment management servers 80*a* and 80*b* (Step S14), the room entrance/exit management server 60 transfers (transmits) the use approval/disapproval information to the room entrance/exit management apparatus 30 (Step S15). Further, the room entrance/exit management apparatus 30 transfers (transmits) the use approval/disapproval information to the personal identification apparatus 50 (Step S16).

Then, the personal identification apparatus 50 stores the respective use approval/disapproval information acquired via the room entrance/exit management apparatus 30 and the room entrance/exit management server 60 into a memory area (nonvolatile memory area or the like) inside the self-apparatus (Step S16).

Thus, when the personal identification apparatus 50 makes access to the room entrance/exit management apparatus 30 as the carrying person (wearer) of the personal identification apparatus 50 enters the room 100, the personal identification apparatus 50 acquires the respective use approval/disapproval information of the information equipments 10 and 20 disposed inside the room 100, from the information equipment management servers 80. In more detail, the personal identification apparatus 50 acquires the respective use approval/disapproval information of the information equipments (the use approval/disapproval information relating to the user U1) from the information equipment management servers 80 via the room entrance/exit management apparatus 30 and the room entrance/exit management server 60. With such an operation, the respective use approval/disapproval information (the use approval/ disapproval information relating to the user U1) which should be originally managed by the information equipment management servers 80 (80*a* and 80*b*) is transferred to the personal identification apparatus 50.

Further, after the use approval/disapproval information are temporarily stored inside the personal identification apparatus 50 and used to manage the corresponding information equipments, as described later, the use approval/ disapproval information are deleted from the personal identification apparatus 50 when the user U1 exits the room, or the like.

Further, the information equipment management servers 80 each transmit a "transfer notification" to the corresponding information equipment 10 in response to the completion of the transfer operation of the use approval/disapproval information or concurrently with the transfer operation (Step S17 (see FIGS. 5 and 11). The "transfer notification" is a notification indicating that the management on the approval or disapproval of use of each information equipment by the user U1 is transferred (authorized) to the personal identification apparatus 50. The information equipments (the MFP 10 and the like) which receive the transfer notification recognize the transfer from the state in which the information equipments are managed by the original management apparatus (the information equipment management server 80*a* or 80*b*) to the state in which the information equipments are managed by the personal identification apparatus 50.

Though the notification process in Step S18 is herein performed after the processes in Steps S13 to 17, this is only one exemplary case. The notification process in Step S18 may be performed, for example, before Step S13 or concurrently with the processes in Steps S13 to S17. When the notification process in Step S18 is performed in a relatively early stage, however, it is preferable that the room entrance/ exit management apparatus 30 should not permit the user U1 to go through until the transfer of the use approval/disapproval information to the personal identification apparatus 50 (Step S16) is ended.

Further, each use approval/disapproval information transmitted from the information equipment management server 80 to the personal identification apparatus 50 may be information (copy information) obtained by copying the use approval/disapproval information inside the information equipment management server 80, or information which has been extracted from the original information equipment management server 80 and once deleted from the information equipment management server 80 (moved information).

<Operation on Access to MFP 10 inside Room>

Figure 6:
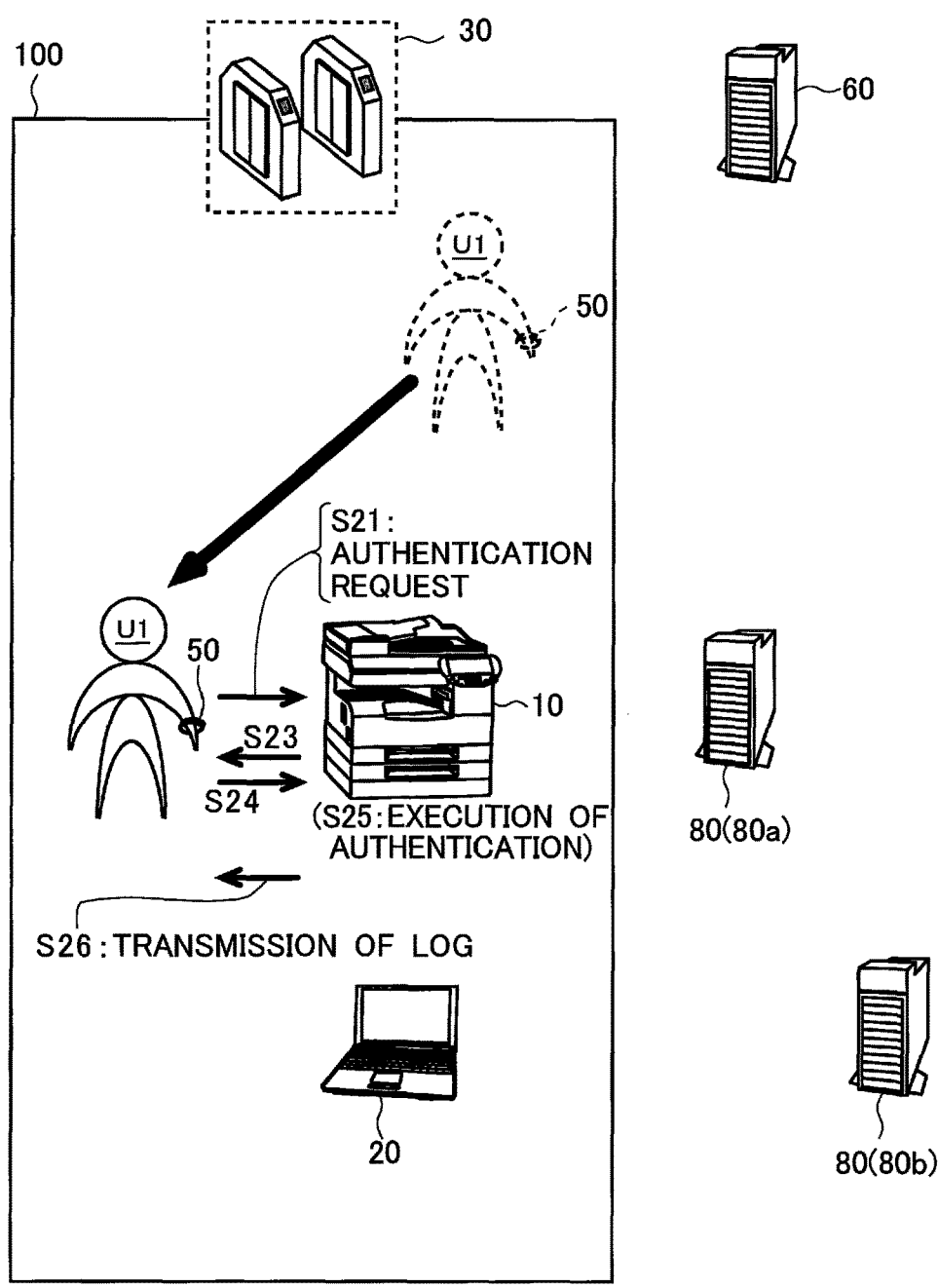
Figure 7:
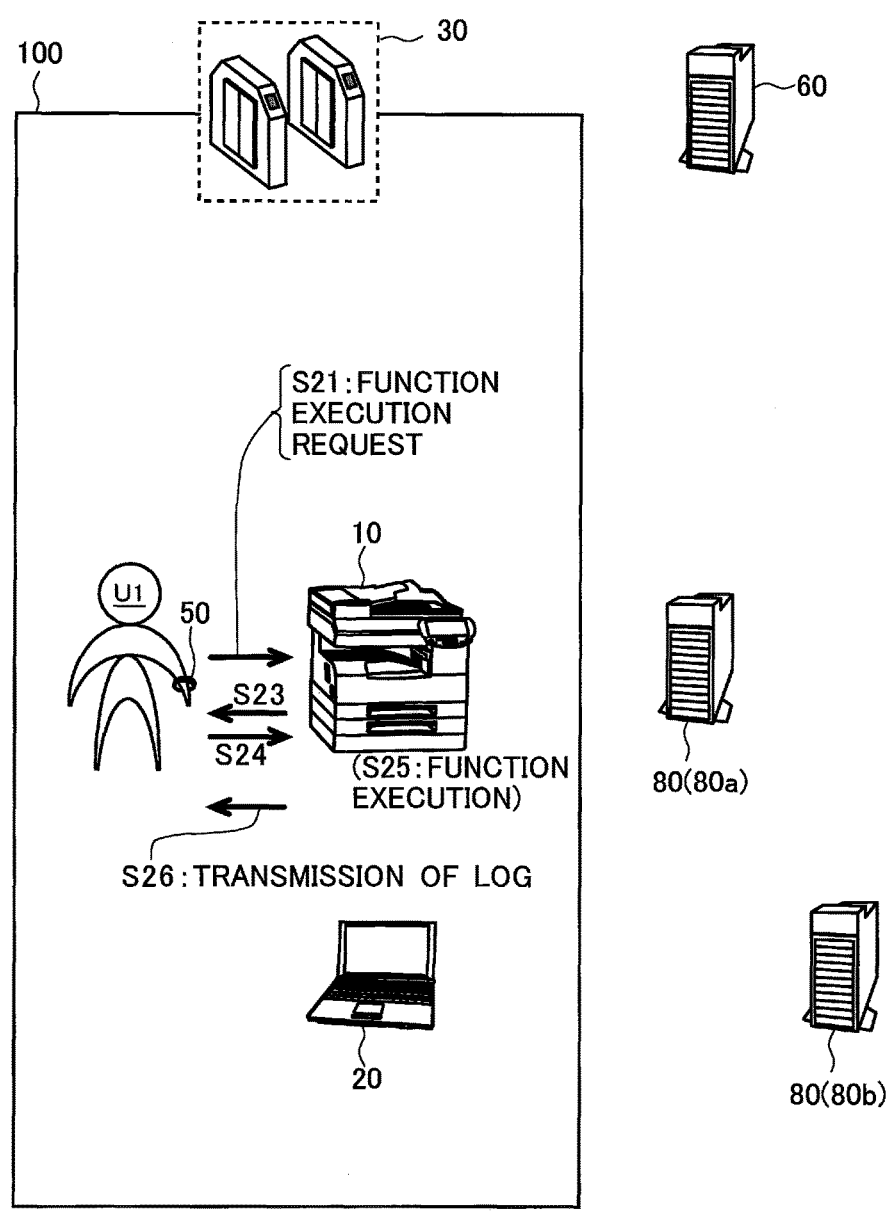

Next, in order to use the MFP 10 inside the room 100, the user U1 moves to the place of the MFP 10 and performs an authentication operation for the MFP 10 (see FIG. 6).

Specifically, first, when the user U1 comes close to the MFP 10 (within a predetermined range from the MFP 10 (for example, within 1 m therefrom)), the MFP 10 and the personal identification apparatus 50 worn by the user U1 establishes short-range wireless communication and the personal identification apparatus 50 sends an authentication request to the MFP 10 (Step S21 (see the top stage of FIG. 12)).

At that time, the MFP 10 determines whether or not the use approval/disapproval information is stored inside the storage part 50. More specifically, the MFP 10 determines whether or not the MFP 10 has already received the "transfer notification" from the information equipment management server 80*a* (see Step S17) (whether or not the MFP 10 is managed by the personal identification apparatus 50) (Step S22). When the MFP 10 determines that the MFP 10 has received the "transfer notification" from the information equipment management server 80*a* (in Step S17) and the MFP 10 is managed by the personal identification apparatus 50, the MFP 10 determines that the use approval/disapproval information is stored inside the personal identification apparatus 50. Further, on the condition that removal of the personal identification apparatus 50 (described next) is not detected, it is determined that effective use approval/disapproval information is stored inside the personal identification apparatus 50 (Step S22).

When it is determined that the effective use approval/ disapproval information is stored inside the personal identification apparatus 50, the process goes to Step S23 and otherwise the process goes to Step S33.

Further, the personal identification apparatus 50 regularly checks whether or not the wearing by the user U1 continues, and when the removal by the user U1 is detected, the personal identification apparatus 50 invalidates the use approval/disapproval information inside the personal identification apparatus 50. In other words, in a case where it is determined that the personal identification apparatus 50 is not held (worn) by the carrying person (user U1) (where the removal of the personal identification apparatus 50 is detected), the use approval/disapproval information stored inside the personal identification apparatus 50 is invalidated. When the invalidated use approval/disapproval information is stored, it is determined that effective use approval/disapproval information is not stored inside the personal identification apparatus 50, and the process goes to Step S33. Furthermore, also when the use approval/disapproval information is not stored inside the personal identification apparatus 50 for some reason, the process goes to Step S33.

In Steps S33 to S36 (see FIG. 14), the authentication process (general authentication process) is performed between the MFP 10 and the information equipment management server 80*a*. Specifically, the MFP 10 transmits an authentication request (request to determine whether to permit the user U1 to use the MFP 10) (also referred to as a "determination request") to the information equipment management server 80*a* (Step S33). In response to the determination request, the information equipment management server 80*a* determines whether approval or disapproval of authentication of the user U1, on the basis of the use approval/disapproval information stored inside the self-apparatus 80*a*, and transmits the determination result to the MFP 10 (Step S34). The MFP 10 controls the operation of the MFP 10 on the basis of the determination result received from the information equipment management server 80*a* (Step S35). Further, the MFP 10 transmits the use history information to the information equipment management server 80*a*, and the information equipment management server 80*a* adds the use history information to the equipment management information inside the self-apparatus 80*a*.

On the other hand, when it is determined that the effective use approval/disapproval information is stored inside the personal identification apparatus 50, the process goes to Step S23. In Steps S23 to S26 (see FIGS. 12 and 14), a communication process between the MFP 10 and the personal identification apparatus 50, instead of the information equipment management server 80*a*, is performed. In other words, on the condition that the use approval/disapproval information of the information equipment is stored in the personal identification apparatus 50, the processes in Steps S23 to S26 are performed.

Specifically, the MFP 10 transmits the determination request (herein, the authentication request) to the personal identification apparatus 50 (Step S23). The determination request is also an inquiry on the approval or disapproval of use of the MFP 10 by the user U1. In response to the determination request, the personal identification apparatus 50 determines whether approval or disapproval of authentication of the user U1 on the basis of the use approval/disapproval information stored in the self-apparatus 50 (Step S51 (FIG. 15)), and transmits the determination result to the MFP 10 (Steps S52 and S24). On the basis of the determination result received from the personal identification apparatus 50, the MFP 10 controls the operation of the MFP 10 (Step S25).

When the user U1 is authenticated on the basis of the use approval/disapproval information inside the personal identification apparatus 50 (the user U1 is permitted to use the MFP 10), the personal identification apparatus 50 transmits the determination result indicating the approval of authentication to the MFP 10. Then, the MFP 10 performs a process based on the determination result (a process of displaying a screen showing "success of authentication" on the touch panel 25 of the MFP 10, a process of displaying the next operation screen after the success of authentication on the touch panel 25 of the MFP 10, and/or the like).

Further, the MFP 10 transmits the use history information (information indicating the success of authentication by the user U1) to the personal identification apparatus 50 (Step S26). When the personal identification apparatus 50 receives the use history information from the MFP 10 (Step S53 (FIG. 15)), the personal identification apparatus 50 temporarily stores therein the use history information (Step S54). For example, the personal identification apparatus 50 adds the use history information as part of the equipment management information (including the use approval/disapproval information) managed inside the personal identification apparatus 50.

After the success of authentication of the user U1, also when an operation by the user U1 is further performed, the same operation is performed. When a setting operation of "full-color copy" is performed and a start button is pressed (Step S21), for example, the following operation is performed (see FIG. 7).

Specifically, the MFP 10 transmits an execution request of "copy including full-color output setting (full-color copy job)" (a determination request on whether approval or disapproval of use for full-color output function, or the like) to the personal identification apparatus 50 (Step S23). In response to the determination request, the personal identification apparatus 50 determines whether approval or disapproval of use of the function by the user U1 (approval or disapproval of execution of full-color copy job), on the basis of the use approval/disapproval information which is temporarily stored inside the self-apparatus 50 (Step S51). Then, the personal identification apparatus 50 transmits the determination result to the MFP 10 (Steps S52 and S24). The MFP 10 controls the operation of the MFP 10 on the basis of the determination result received from the personal identification apparatus 50 (Step S25).

When the user U1 is permitted to use the full-color output function of the MFP 10 on the basis of the use approval/disapproval information (approval/disapproval information for each function, usage amount limitation information, and the like) inside the personal identification apparatus 50, for example, the determination result indicating that use of the function should be permitted is transmitted from the personal identification apparatus 50 to the MFP 10. Then, the MFP 10 performs the process (a full-color copy process based on the setting, and the like) based on the determination result.

Further, the MFP 10 transmits the use history information (information indicating the execution of the (full-color) copy by the user U1) to the personal identification apparatus 50 (Steps S26 and S53), and the personal identification apparatus 50 temporarily stores the use history information into the self-apparatus 50 (Step S54).

Figure 8:
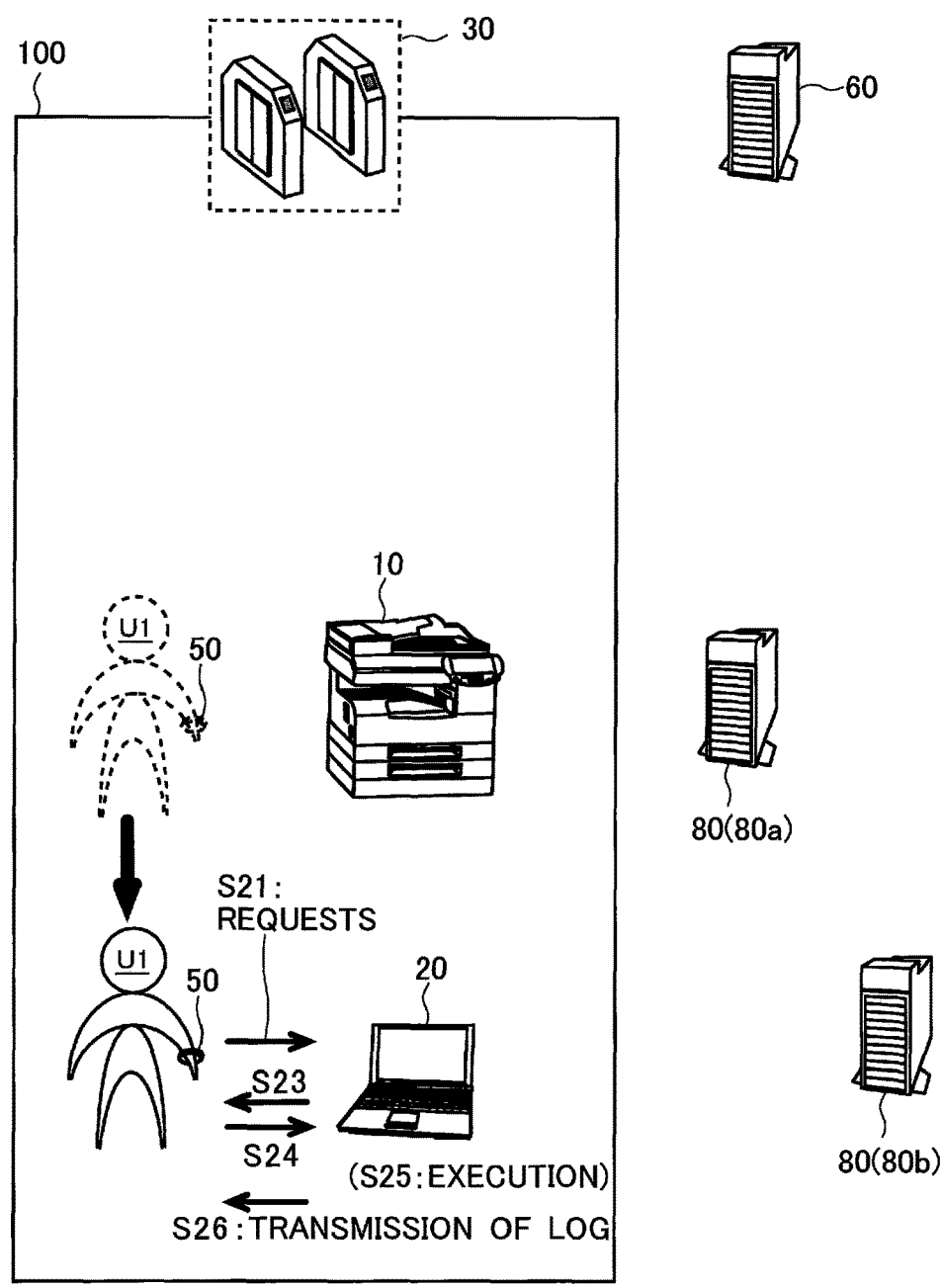
Figure 9:
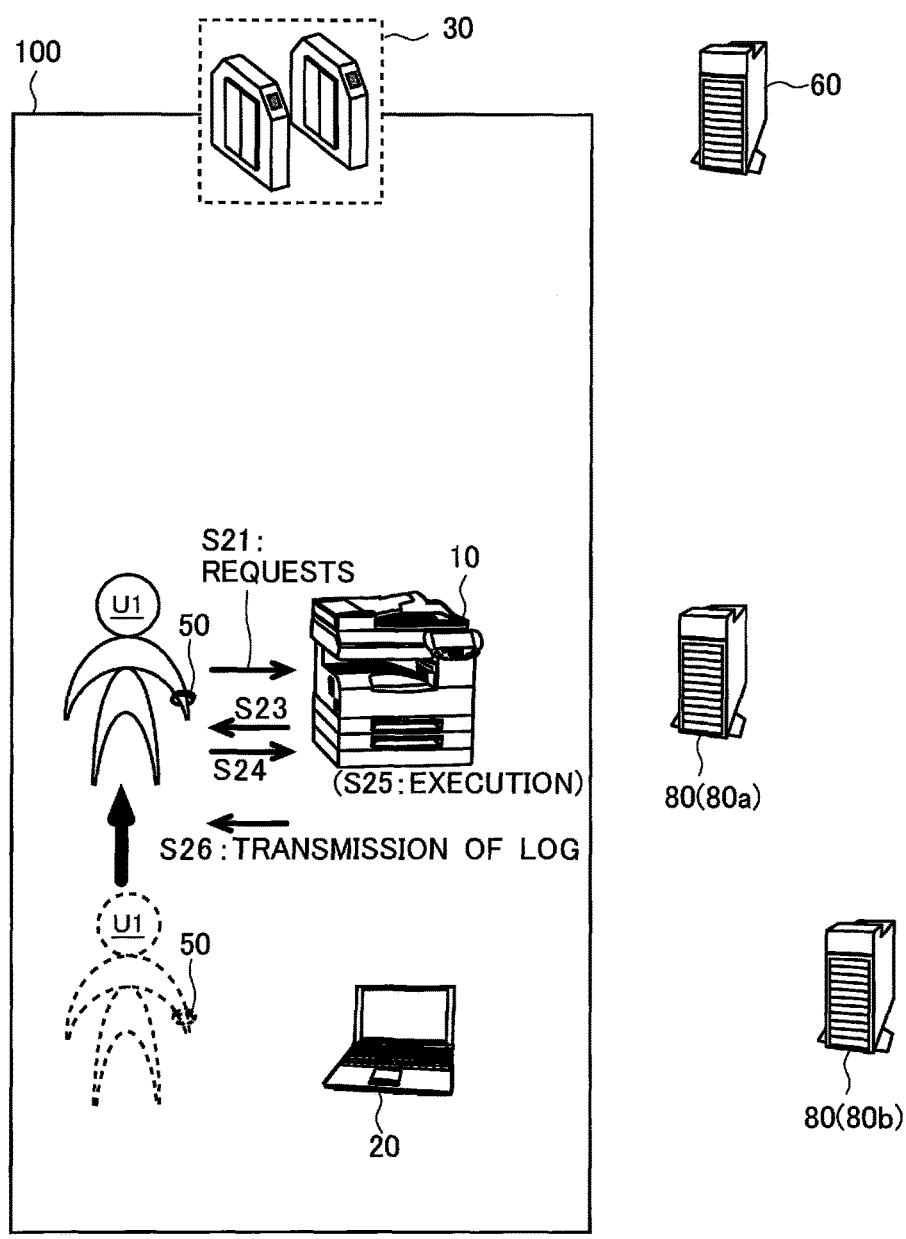

After that, the user U1 can use another information equipment (another MFP 10, one of the personal computers 20, and/or the like) in the same manner (see FIG. 8). Further, the user U1 can use the first MFP 10 again (see FIG. 9). Further, when the user U1 uses the personal computer 20, the personal computer 20 performs communication with the personal identification apparatus 50 (instead of the information equipment management server 80 (80*b*)) and uses the use approval/disapproval information inside the personal identification apparatus 50, to thereby acquire the determination result on the approval or disapproval of use of the personal computer 20.

Thus, each information equipment controls the operation of the information equipment, on the basis of the determination result using the use approval/disapproval information stored in the personal identification apparatus 50 (in detail, the determination result received from the personal identification apparatus 50 which functions as a proxy server of the information equipment management server 80).

<Operation on Exit from Room>

Next, description will be made on an operation at the time when the user U1 exits the room 100 (see FIG. 10).

After using the information equipment inside the room 100, the user U1 goes through the room entrance/exit management apparatus 30 and exits the room 100. When the user U1 exits the room 100, the following operation is performed (see FIG. 13 and the like). Further, FIG. 13 is a view showing the operation of the information equipment management system 1 at the time when the user U1 exits the room.

First, as the carrying person (wearer) U1 of the personal identification apparatus 50 exits the room 100, the personal identification apparatus 50 makes access to the room entrance/exit management apparatus 30.

At that time, the personal identification apparatus 50 of the user U1 deletes all the use approval/disapproval information (respective use approval/disapproval information of the information equipments) which are temporarily stored in the storage part of the self-apparatus 50, from the personal identification apparatus 50.

Further, the personal identification apparatus 50 returns management authority of the information equipments to the information equipment management servers 80. Specifically, the personal identification apparatus 50 transmits a return notification (also referred to as a transfer end notification) of the management authority to the information equipment management servers 80 via the room entrance/exit management apparatus 30 and the room entrance/exit management server 60. In detail, after the personal identification apparatus 50 transmits the return notification to the room entrance/exit management apparatus 30 (Step S71), the room entrance/exit management apparatus 30 transmits the return notification to the room entrance/exit management server 60 (Step S72). Furthermore, the room entrance/exit management server 60 transmits the return notification to the information equipment management servers 80 (80*a* and 80*b*) (Step S73), and the information equipment management servers 80 (80*a* and 80*b*) transmit the return notification to the corresponding information equipments 90, respectively (Step S74 (see FIGS. 10 and 13)). In detail, the information equipment management server 80*a* transmits the return notification to the plurality of MFPs 10 and the information equipment management server 80*b* transmits the return notification to the plurality of personal computers 20.

The information equipments (the MFPs 10 and the like) which receive the return notification recognize that the state in which the information equipments are managed by the personal identification apparatus 50 is ended and the state in which the information equipments are managed by the original management apparatus (the information equipment management server 80*a* or the 80*b*) is returned.

Further, the use history information (the use history information of the information equipments) stored inside the personal identification apparatus 50 are also transmitted to the information equipment management servers 80 together with the return notification (through the same channel). For example, the use history information of the MFP 10*a* is transmitted to the information equipment management server 80*a* and the use history information of the personal computer 20 is transmitted to the information equipment management server 80*b*.

Furthermore, in a case where the use approval/disapproval information are moved from the information equipment management servers 80 to the personal identification apparatus 50 (the use approval/disapproval information are once deleted from the information equipment management servers 80) or the like, the use approval/disapproval information themselves deleted from the personal identification apparatus 50 may be transmitted (returned) (together with the return notification or the like) to the information equipment management servers 80. Further, in a case where the usage amount limitation information in the use approval/disapproval information is updated, it is preferable that the updated usage amount limitation information (for example, information on the reduced number of remaining printable sheets ("100" pieces left, or the like)) should be transmitted to the information equipment management servers 80. The information equipment management servers 80 may store and manage the received use approval/disapproval information into the information equipment management server 80*a* as the updated (latest) use approval/disapproval information.

Thus, the alternative management by the personal identification apparatus 50 is ended. In other words, the state (or period) in which the management on approval or disapproval of use of the information equipments has been transferred from the information equipment management servers 80 to the personal identification apparatus 50 and the alternative management is performed by the personal identification apparatus 50 is ended.

1-6. Effects, Etc. Of the First Preferred Embodiment

Thus, when the information equipments inside the room 100 are used, the information equipments (the MFPs 10 and the like) use the use approval/disapproval information inside the personal identification apparatus 50, instead of using the use approval/disapproval information inside the information equipment management servers 80, to thereby control the operation of the information equipments (the MFPs 10 and the like). In more detail, the operation based on the approval or disapproval of use of the information equipments is performed. Specifically, at the timing of using the use approval/disapproval information, the use approval/disapproval information inside the personal identification apparatus 50 is used (alternatively used), instead of the use approval/disapproval information inside the information equipment management servers 80. In short, the personal identification apparatus 50 serves as the proxy server (alternative server) of the information equipment management servers 80.

Therefore, even without always performing communication between the information equipment management server 80 and the information equipment (the MFP 10 or the like) to be managed by the information equipment management server 80, it is possible to appropriately manage the information equipment to be managed by the information equipment management server 80. In more detail, it is possible to reduce the communication load between the information equipments (the MFPs 10 and the like) and the information equipment management servers 80 and reduce the load of the information equipment management servers 80. Further, in order to use the information equipment by each user, since the communication between the personal identification apparatus 50 of the user and the information equipment to be used by the user has only to be performed individually, it is possible to disperse the load of the communication. Particularly, it is possible to suppress the decrease in responsiveness (elongated response time (time required from the point in time of transmitting the determination request to the point in time of receiving the determination result, or the like) as the processes are concentrated on the information equipment management server 80 and improve the responsiveness in the use of the information equipments.

Particularly, since the respective use approval/disapproval information for each user relating to the plurality of information equipments are managed by the personal identification apparatus 50 of the user, it is possible to more appropriately reduce the management load of each information equipment management server 80 corresponding to the plurality of information equipments.

Further, in the above preferred embodiment, by utilizing the feature of the personal identification apparatus 50 capable of relatively reliably identify a person, the information of the person, which are dispersed to the plurality of information equipment management servers 80 and managed therein, are concentrated on the personal identification apparatus 50. Therefore, it is possible to ensure integration of the information dispersed into the plurality of information equipment management servers 80.

Further, in the above preferred embodiment, when the personal identification apparatus 50 determines that the personal identification apparatus 50 is not held (worn) by the carrying person (user U1), the personal identification apparatus 50 invalidates the use approval/disapproval information stored inside the personal identification apparatus 50 (Step S22). Therefore, by using the reliable authentication using the biometric information, which is performed by the personal identification apparatus 50, it is possible to reinforce the personal authentication and more reliably ensure the security. For example, it is possible to prevent the personal identification apparatus 50 of one user from being used by another user without permission.

The present system 1 is an information equipment management system which comprises the information equipments and the information equipment management servers and also comprises a room entrance/exit management system, as a subsystem, which comprises the room entrance/exit management apparatus and the room entrance/exit management server.

Generally, in most cases, the information equipment management system and the room entrance/exit management-system are managed separately. For example, the information equipment management system and the room entrance/exit management system are provided separately. Then, the entrance and exit of each person is managed through the communication between the room entrance/exit management apparatus and the room entrance/exit management server, and the use of an information equipment by each person is managed through the communication between the information equipment and the information equipment management server. Further, in most cases, different administrators are assigned to these systems, respectively. Thus, in most cases, the management of the entrance and exit and the management of the information equipments are performed altogether independently.

On the other hand, in the present system 1, by using the personal identification apparatus 50 (as an intermediary), fusion between the management of the entrance and exit and the management of the information equipments is ensured. Specifically, first, the personal identification apparatus 50 identifies (specifies) the person (user U1). Then, after the entrance of the user U1 into the room 100 is confirmed by the room entrance/exit management apparatus 30 and the room entrance/exit management server 60, the management information (management information for the user U1) on the information equipments inside the room 100 is transferred from the information equipment management server 80 to the personal identification apparatus 50. In other words, after the user U1 enters the room 100, the management function of the information equipment management server 80 on the information equipments inside the room 100 is alternatively performed by the personal identification apparatus 50. It is thereby possible to ensure the fusion between the management of the entrance and exit and the management of the information equipments while the room entrance/exit management server 60 and the information equipment management servers 80 remain.

2. The Second Preferred Embodiment

<2-1. Overview>

The second preferred embodiment is a variation of the first preferred embodiment. Hereinafter, description will be made, centering on the difference between the first and second preferred embodiments.

In the above-described first preferred embodiment, when the user U1 enters the room 100, the use approval/disapproval information for the userl U1 is transferred from the information equipment management servers 80 to the personal identification apparatus 50 via the room entrance/exit management apparatus 30 and the like (see FIG. 5), but this is only one exemplary case.

Figure 17:
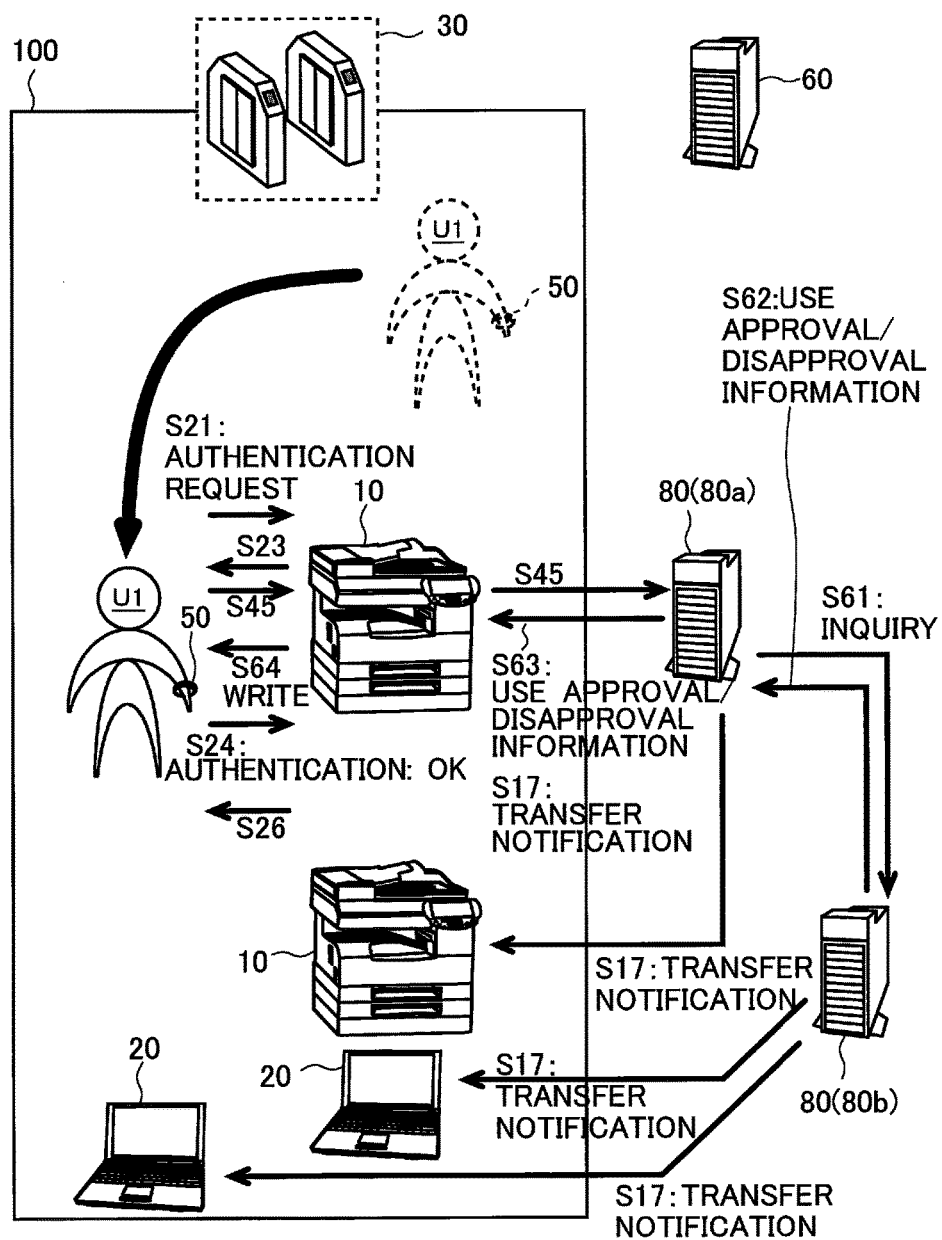
Figure 18:
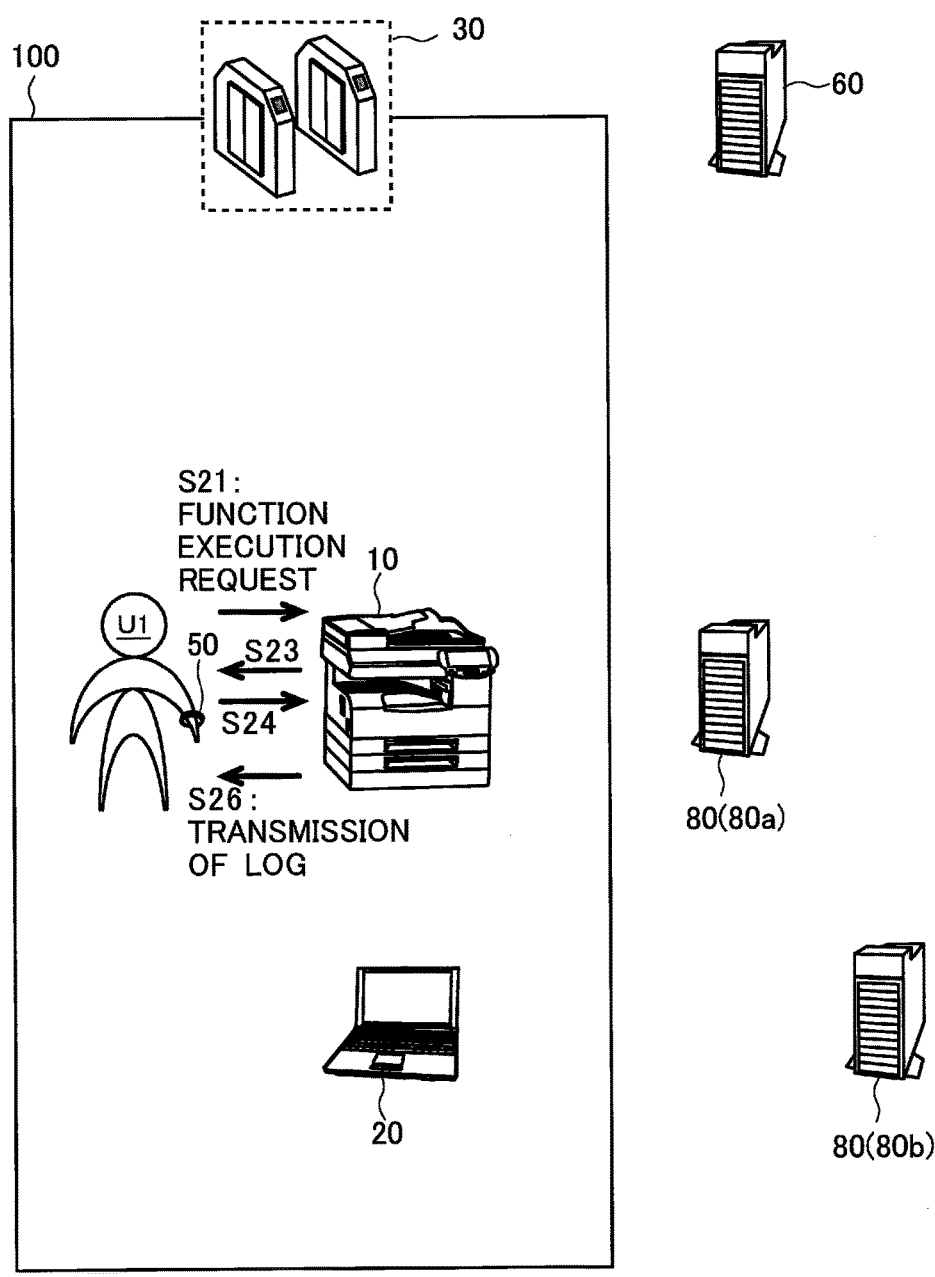

For example, after the point in time when the user U1 enters the room 100, when the user U1 makes first access to the information equipment inside the room 100, the use approval/disapproval information for the user U1 may be transferred from the information equipment management servers 80 to the personal identification apparatus 50 via the information equipment (for example, the MFP 10) to which the first access is made, and the like (see FIG. 17). In the second preferred embodiment, such an aspect will be exemplarily shown.

<2-2. Detailed Operation>

<Operation on Entrance into Room>

Figure 21:
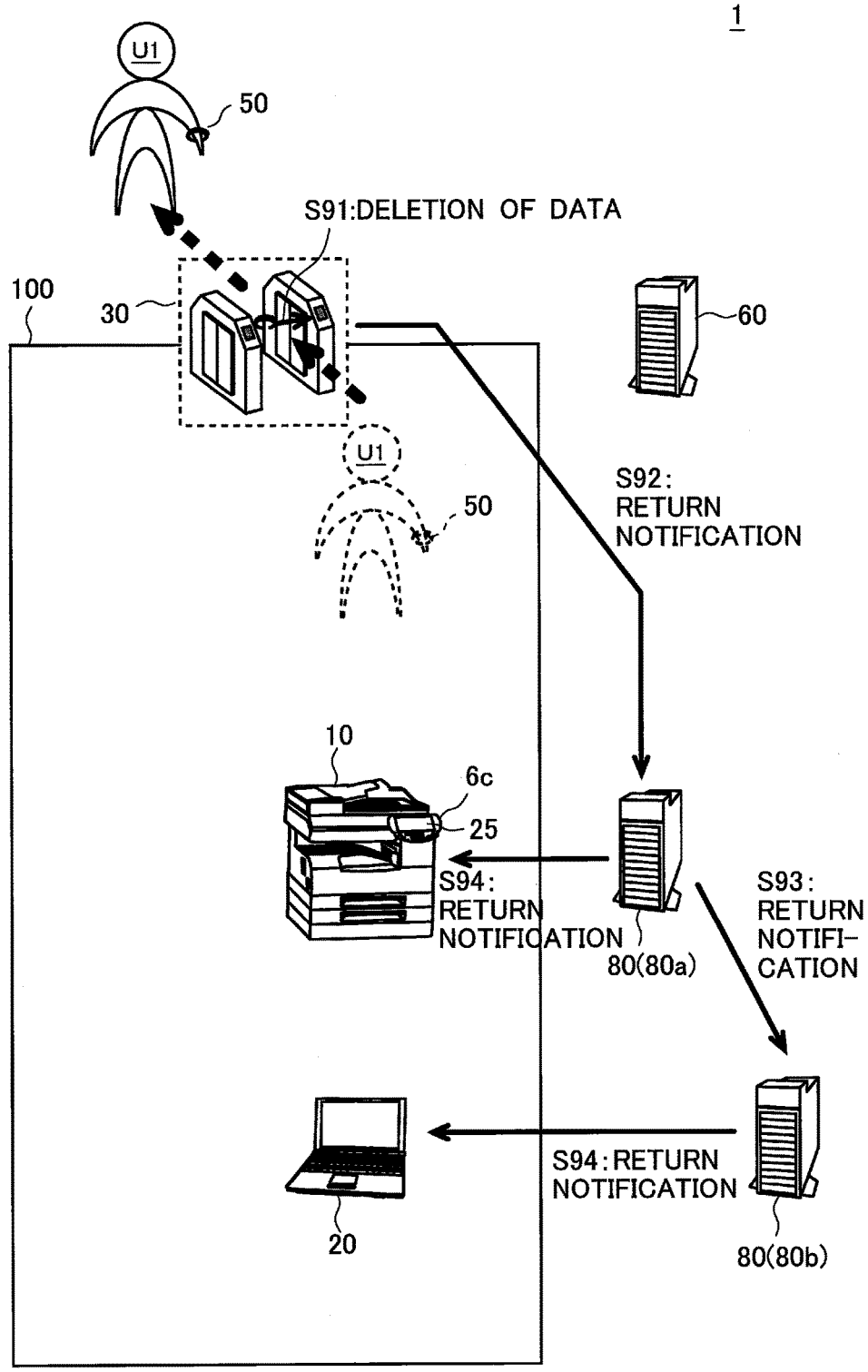
Figure 22:
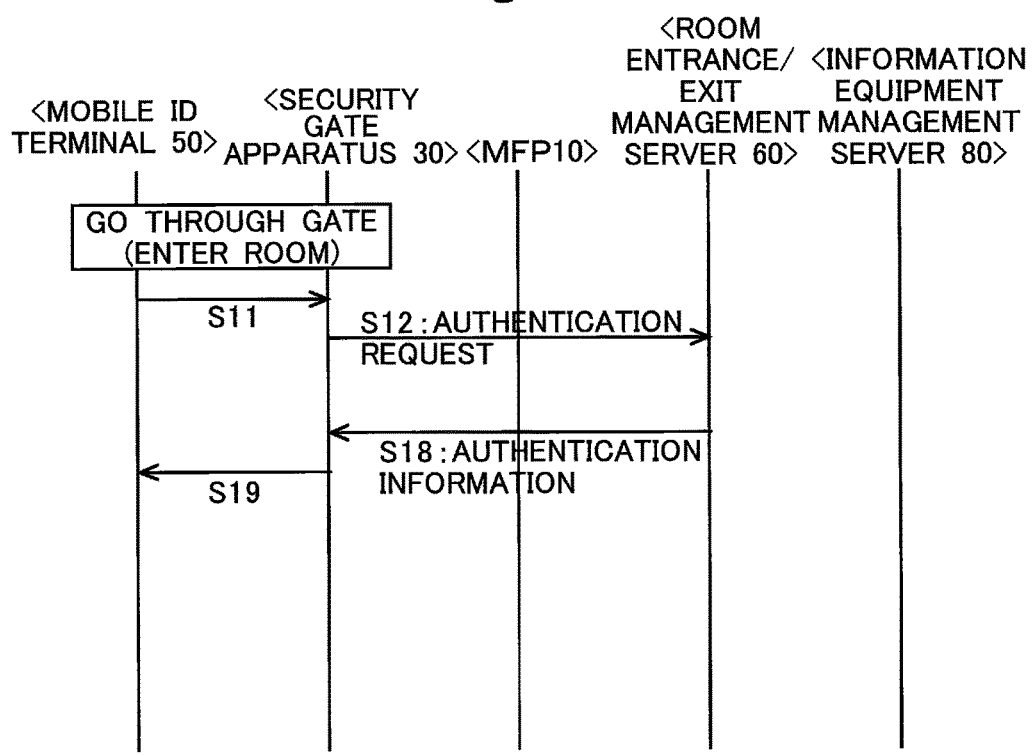
FIGS. 22 to 24 are timing charts each showing the operation in the information equipment management system.
Figure 23:
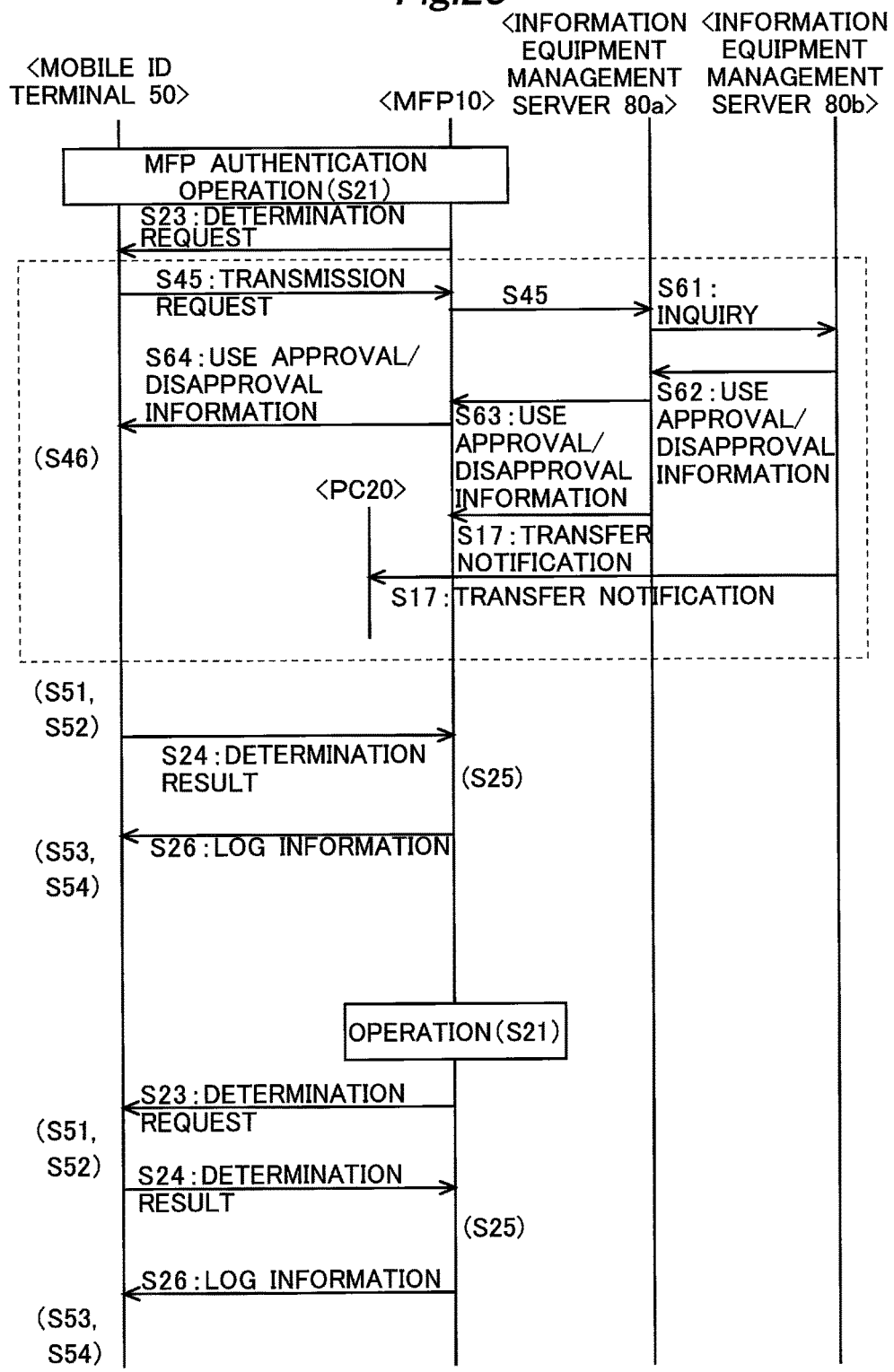
Figure 24:
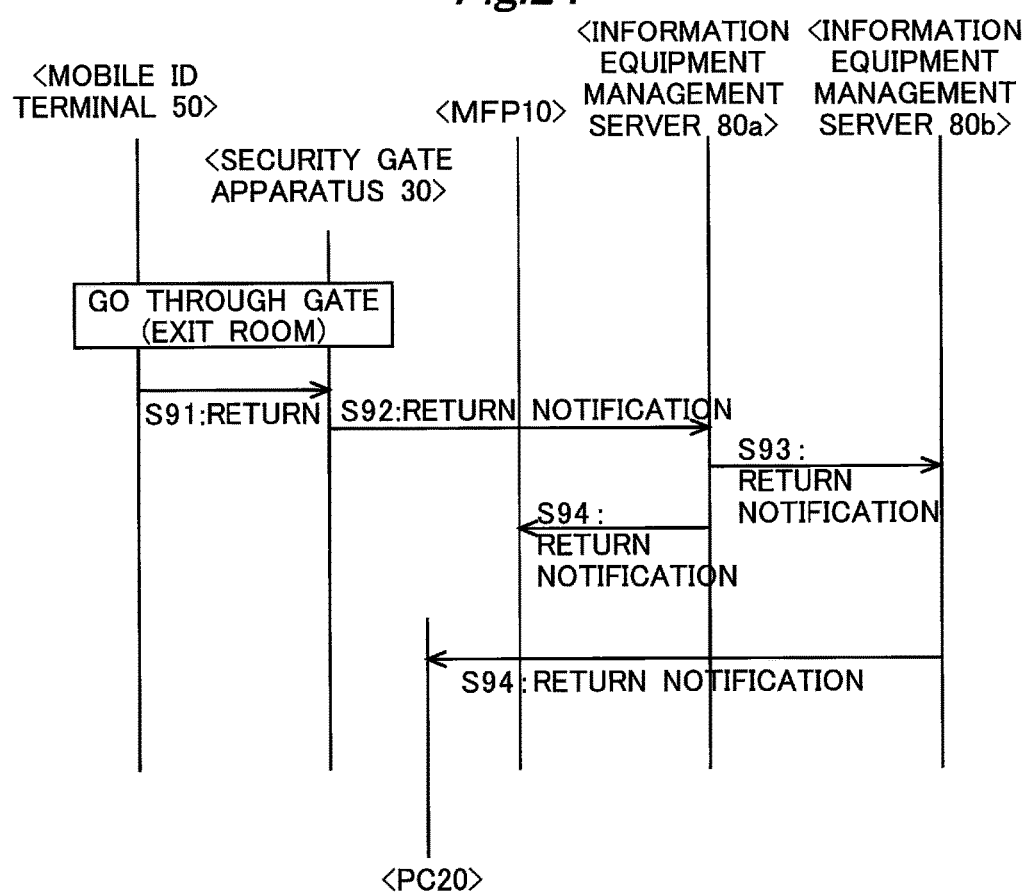
Figure 25:
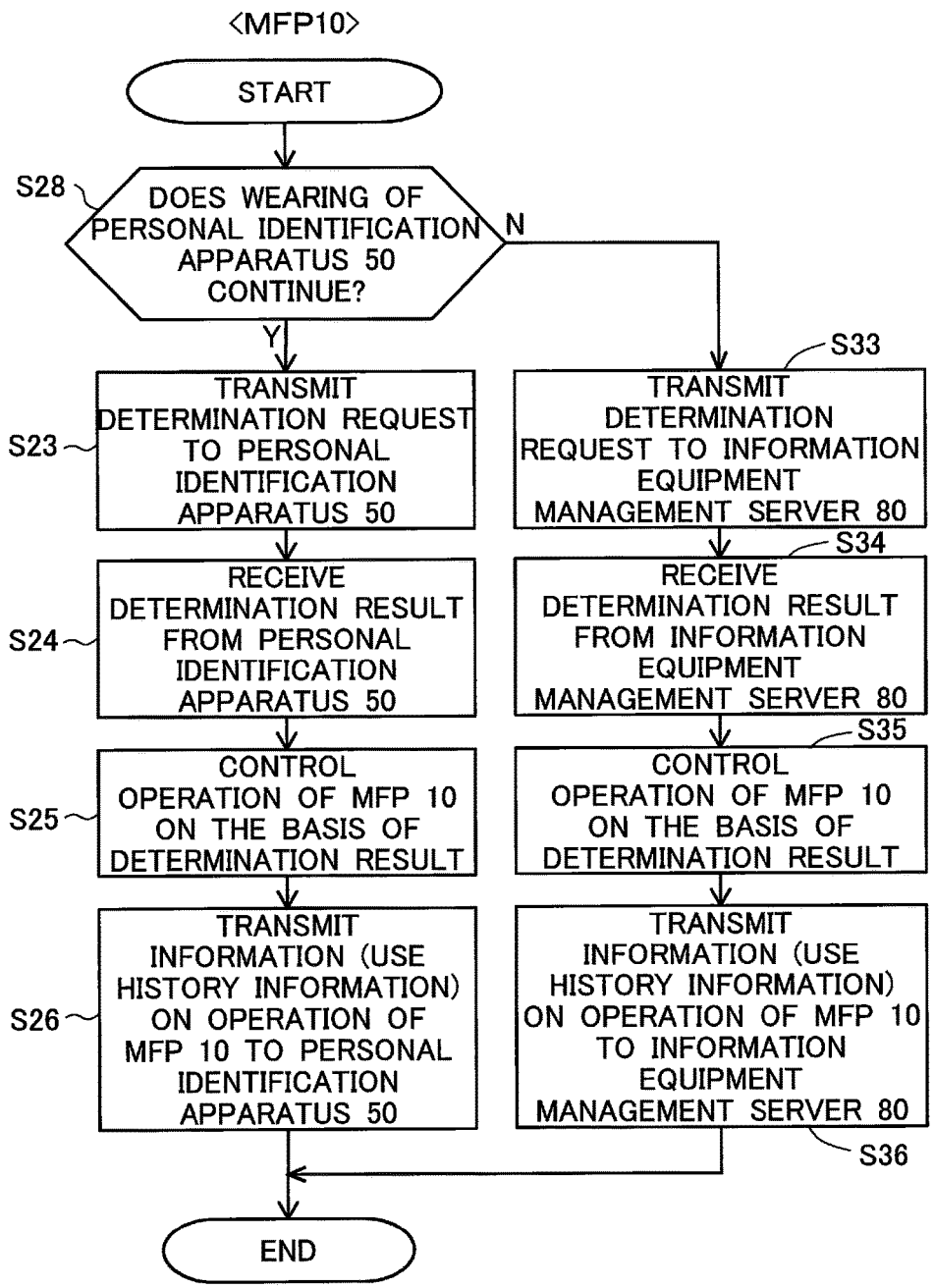
FIG. 25 is a flowchart showing an operation of the MFP.
Figure 26:
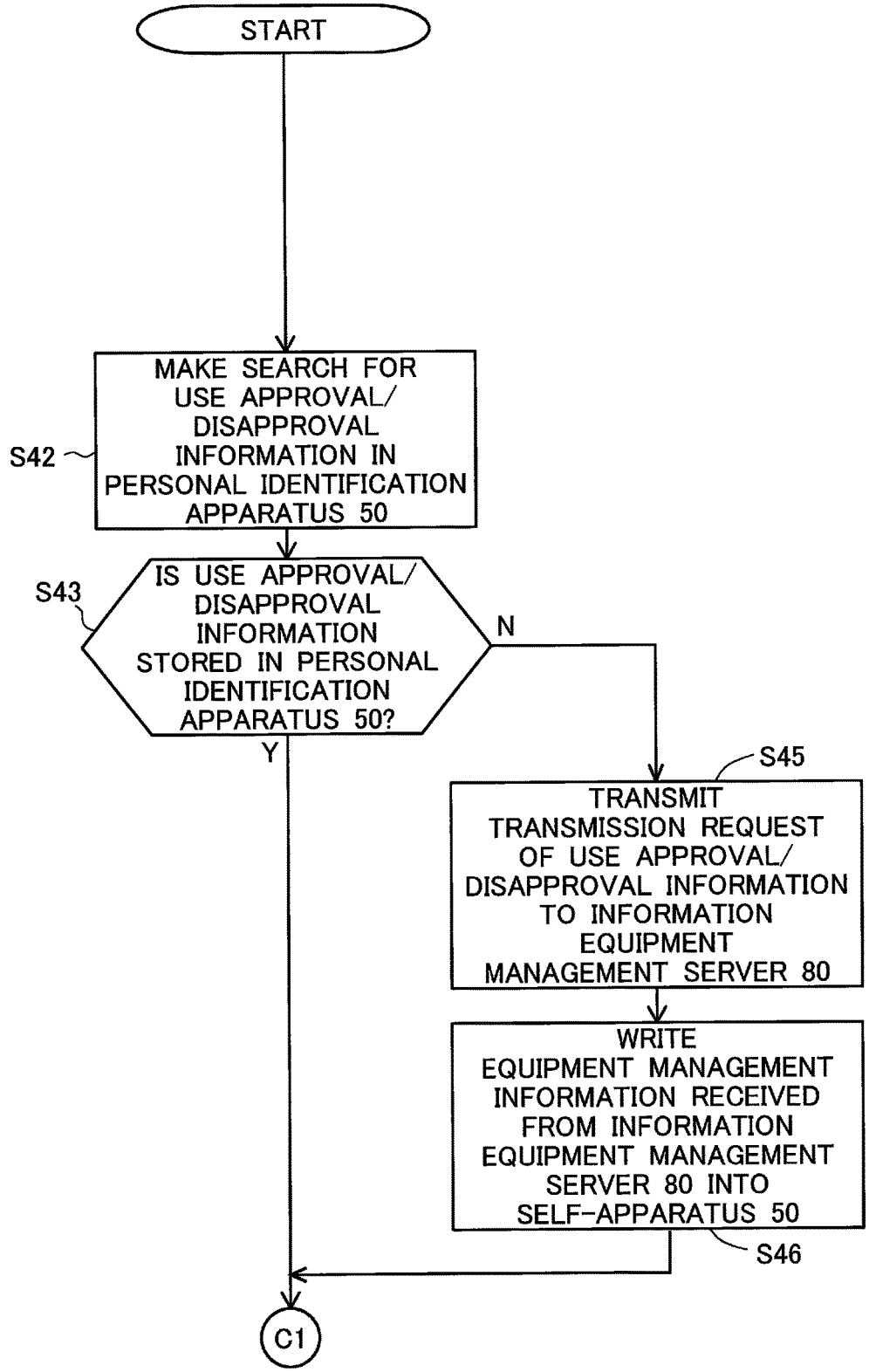
FIG. 26 is a flowchart showing an operation of the personal identification apparatus.

FIGS. 16 to 21 are conceptual diagrams each showing an operation in the information equipment management system 1 in accordance with the second preferred embodiment, and FIGS. 22 to 24 are timing charts each showing the operation in the information equipment management system 1 in accordance with the second preferred embodiment. Further, FIG. 25 is a flowchart showing an operation of the MFP 10 in accordance with the second preferred embodiment, and FIG. 26 is a flowchart showing an operation of the personal identification apparatus 50 in accordance with the second preferred embodiment.

Figure 16:
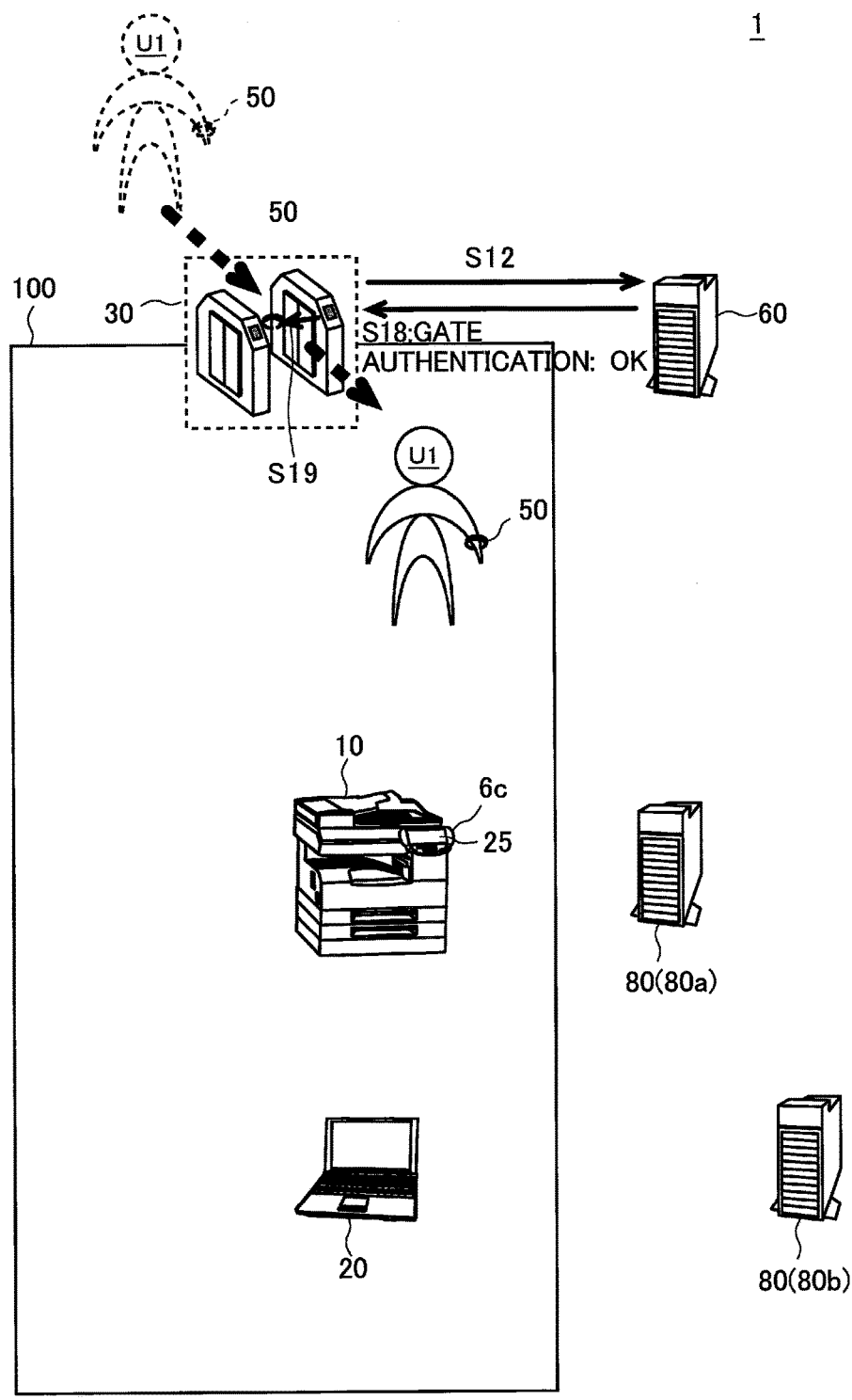
FIGS. 16 to 21 are views each showing an operation in the information equipment management system (in accordance with a second preferred embodiment)

Until Step S12, the same operations as those in the first preferred embodiment are performed (see FIGS. 16 and 22). In the second preferred embodiment, however, the room entrance/exit management server 60 performs a determination process on the approval or disapproval of entrance of the user U1 into the room, or the like, in response to the room entrance permission request of the user U1 but does not perform an acquisition process of the use approval/disapproval information. In detail, as can be seen from the comparison between FIGS. 22 and 11, the processes in Steps S13 to S17 are not performed.

Further, the room entrance/exit management server 60 transmits a process result (determination result) of the determination process to the room entrance/exit management apparatus 30 (Step S18), and the room entrance/exit management apparatus 30 performs an operation based on the determination result. Specifically, an operation of permitting the user U1 to enter the room is performed.

Furthermore, the room entrance/exit management apparatus 30 transmits information indicating that the user U1 enters the room 100 to the personal identification apparatus 50 and causes the personal identification apparatus 50 to store therein the information (Step S19 (FIG. 22)).

<Operation on First Access to Information Equipment (MFP 10) Inside Room>

Next, in order to use the MFP 10 inside the room 100, the user U1 moves to the place of the MFP 10. In response to this move, the personal identification apparatus 50 of the user U1 performs the authentication operation with respect to the MFP 10 (see FIG. 17).

Specifically, first, when the user U1 comes close to the MFP 10 (within a predetermined range from the MFP 10), the MFP 10 and the personal identification apparatus 50 worn by the user U1 establishes short-range wireless communication and the personal identification apparatus 50 sends the authentication request to the MFP 10 (Step S21 (see FIG. 23)).

In Step S28 (FIG. 25), The MFP 10 determines whether or not the removal (indicating that the user U1 cancels the wearing) of the personal identification apparatus 50 is detected. Further, the personal identification apparatus 50 regularly checks whether or not the wearing by the user U1 continues, and when the removal by the user U1 is detected, the information indicating that the removal is detected is stored into the personal identification apparatus 50. The MFP 10 performs communication with the personal identification apparatus 50, to thereby confirm whether or not the removal is detected. When the removal is detected, the process goes to Steps S33 to S36 (see the first preferred embodiment). On the other hand, when the removal is not detected, the process goes to Step S23.

Hereinafter, description will further continue on the case where the process goes to Step S23.

In Step S23 (see FIGS. 17, 23, and 25), the MFP 10 transmits the determination request (herein, the authentication request) to the personal identification apparatus 50.

As shown in FIG. 26, the personal identification apparatus 50 performs the processes in Step S42 and the following steps, in response to the determination request.

In Step S42, first, the personal identification apparatus 50 makes a search for the use approval/disapproval information in the personal identification apparatus 50.

Then, in Step S43, the personal identification apparatus 50 determines whether or not the use approval/disapproval information is stored in the personal identification apparatus 50.

When the use approval/disapproval information is stored, the process goes to Step S51, and otherwise the process goes to Step S45.

Herein, it is assumed that the use approval/disapproval information is not stored yet and the process goes to Step S45.

In Step S45, the personal identification apparatus 50 transmits the transmission request of the use approval/disapproval information of the information equipments inside the room 100 to the information equipment management server 80a (the information equipment management server 80a which manages the MFP 10) via the MFP 10. The transmission request is transmitted to the information equipment management server 80a with information on the room 100 in which the user U1 is currently present.

Herein, while the room entrance/exit management server 60 collects the use approval/disapproval information and transmits the use approval/disapproval information to the personal identification apparatus 50 in the first preferred embodiment, an operation different from the above is performed in the second preferred embodiment. Specifically, in the second preferred embodiment, the information equipment management server 80a corresponding to the MFP 10 to which the first access is to be made after the entrance of the user U1 into the room 100 collects the use approval/disapproval information and transfers the use approval/disapproval information to the personal identification apparatus 50. More specifically, the information equipment management server 80a acquires the use approval/disapproval information (in more detail, the use approval/disapproval information relating to the user U1) of the plurality of information equipments (10, 20, and the like) disposed in the room 100, from the plurality of information equipment management servers 80 (80a and 80b) for management on the plurality of information equipments. Then, the information equipment management server 80a transfers the use approval/disapproval information acquired from the information equipment management servers 80 (the self-apparatus 80a and another apparatus 80b) to the personal identification apparatus 50 via the MFP 10.

Specifically, the information equipment management server 80a acquires the use approval/disapproval information on the plurality of information equipments disposed in the room 100 on the basis of the above-described "device list" (the list of the plurality of information equipments disposed inside the room 100). Further, in the second preferred embodiment, it is assumed that the device list is stored in the information equipment management servers 80 (80a and 80b), respectively.

In detail, first, the information equipment management server 80a notifies (transmits or the like) the transmission request of the use approval/disapproval information to the information equipment management servers 80 (80a and 80b) determined on the basis of the device list, to thereby require the use approval/disapproval information (Step S61 (see FIGS. 17 and 23)). When the information equipment management server 80a acquires (receives or the like) the (latest) use approval/disapproval information from the information equipment management servers 80 (Step S62), the information equipment management server 80a transmits the use approval/disapproval information to the MFP 10 (Step S63). Further, the MFP 10 transfers (transmits) the use approval/disapproval information to the personal identification apparatus 50 (Step S64).

Then, the personal identification apparatus 50 stores the use approval/disapproval information received via the MFP 10 or the like into the memory area (nonvolatile memory area or the like) inside the self-apparatus 50 (Step S46).

Thus, as the carrying person (wearer) of the personal identification apparatus 50 makes first access to the information equipment inside the room 100, the personal identification apparatus 50 acquires the use approval/disapproval information of the information equipments 10 and 20 disposed inside the room 100 from the information equipment management server. In more detail, the personal identification apparatus 50 acquires the use approval/disapproval information (use approval/disapproval information relating to the user U1) of the information equipments from the information equipment management servers 80 via one information equipment (for example, the MFP 10). With such an operation, the use approval/disapproval information (in detail, the use approval/disapproval information relating to the user U1) which should be originally managed by the information equipment management servers 80 (80a and 80b) are transferred to the personal identification apparatus 50.

Further, after the use approval/disapproval information is temporarily stored in the personal identification apparatus 50 and used for management of the information equipments, the use approval/disapproval information is deleted from the personal identification apparatus 50 when the user U1 exits the room, or the like, as described later.

After Step S46, in Step S51, the personal identification apparatus 50 determines whether approval or disapproval of authentication of the user U1 on the basis of the use approval/disapproval information stored in the nonvolatile area inside the self-apparatus 50 (Step S51 (FIG. 15)), and transmits the determination result to the MFP 10 (Steps S52 and S24). The MFP 10 controls the operation of the MFP 10 on the basis of the determination result received from the personal identification apparatus 50 (Step S25).

When the user U1 is authenticated (the user U1 is permitted to use the MFP 10) on the basis of the use approval/disapproval information stored inside the personal identification apparatus 50, for example, the determination result indicating that the authentication is permitted is transmitted from the personal identification apparatus 50 to the MFP 10. Then, the MFP 10 performs the process (process of displaying a screen indicating the success of authentication on the touch panel 25 of the MFP 10, or the like) on the basis of the determination result.

Further, the MFP 10 transmits the use history information (information indicating the success of authentication by the user U1) to the personal identification apparatus 50 (Step S26). When the personal identification apparatus 50 receives the use history information from the MFP 10 (Step S53 (FIG. 15)), the personal identification apparatus 50 temporarily stores the use history information in the self-apparatus 50 (Step S54). For example, the personal identification apparatus 50 adds the use history information as part of the equipment management information (including the use approval/disapproval information) managed inside the personal identification apparatus 50.

After that, also when an operation by the user U1 is further performed, the same operation is performed. When the setting operation of "full-color copy" is performed and the start button is pressed (Step S21), for example, the following operation is performed (see FIG. 18). In this case, however, since the use approval/disapproval information is already stored in the personal identification apparatus 50, the process goes from Step S43 (FIG. 26) to Step S51 (FIG. 15). Specifically, the personal identification apparatus 50 does not perform the acquisition process of the use approval/disapproval information (Steps S45, S46, and the like) but performs an alternative permission process and the like (Steps S51 to S54) (see FIGS. 12 and 15) by using the use approval/disapproval information stored inside the personal identification apparatus 50.

Specifically, first, the MFP 10 transmits the execution request of "copy including full-color output setting" (the determination request on whether approval or disapproval of use for full-color output function) to the personal identification apparatus 50 (Step S23). In response to the determination request, the personal identification apparatus 50 determines whether approval or disapproval of use of the function by the user U1, on the basis of the use approval/disapproval information which is temporarily stored inside the self-apparatus 50 (Step S51). Then, the personal identification apparatus 50 transmits the determination result to the MFP 10 (Steps S52 and S24). The MFP 10 controls the operation of the MFP 10 on the basis of the determination result received from the personal identification apparatus 50 (Step S25).

When the user U1 is permitted to use the full-color output function of the MFP 10 on the basis of the use approval/disapproval information inside the personal identification apparatus 50, for example, the determination result indicating that the use of the function should be permitted is transmitted from the personal identification apparatus 50 to the MFP 10. Then, the MFP 10 performs the process (the full-color copy process based on the setting, and the like) based on the determination result.

Further, the MFP 10 transmits the use history information (information indicating the execution of the (full-color) copy by the user U1) to the personal identification apparatus 50 (Steps S26 and S53), and the personal identification apparatus 50 temporarily stores the use history information into the self-apparatus 50 (Step S54).

Figure 19:
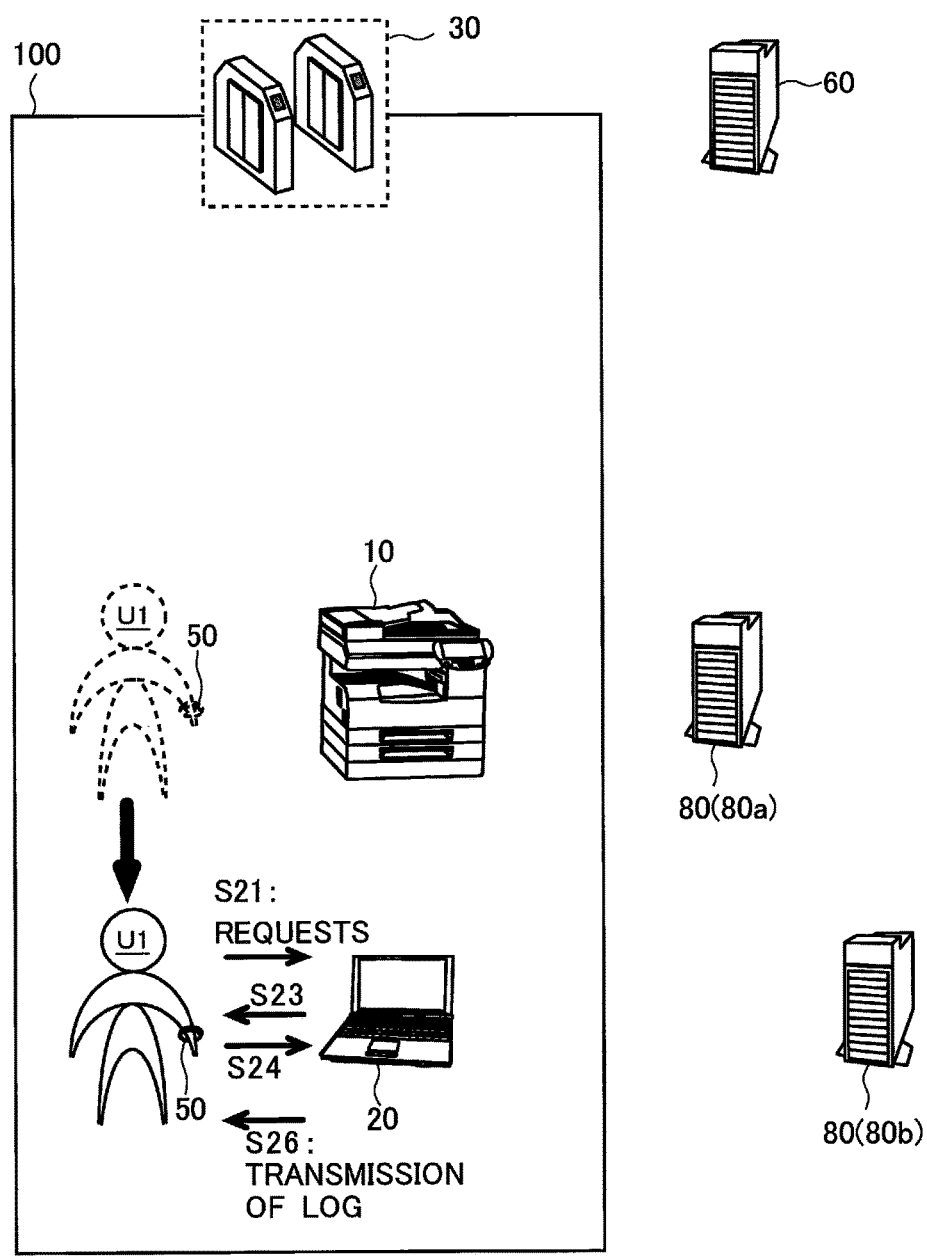
Figure 20:
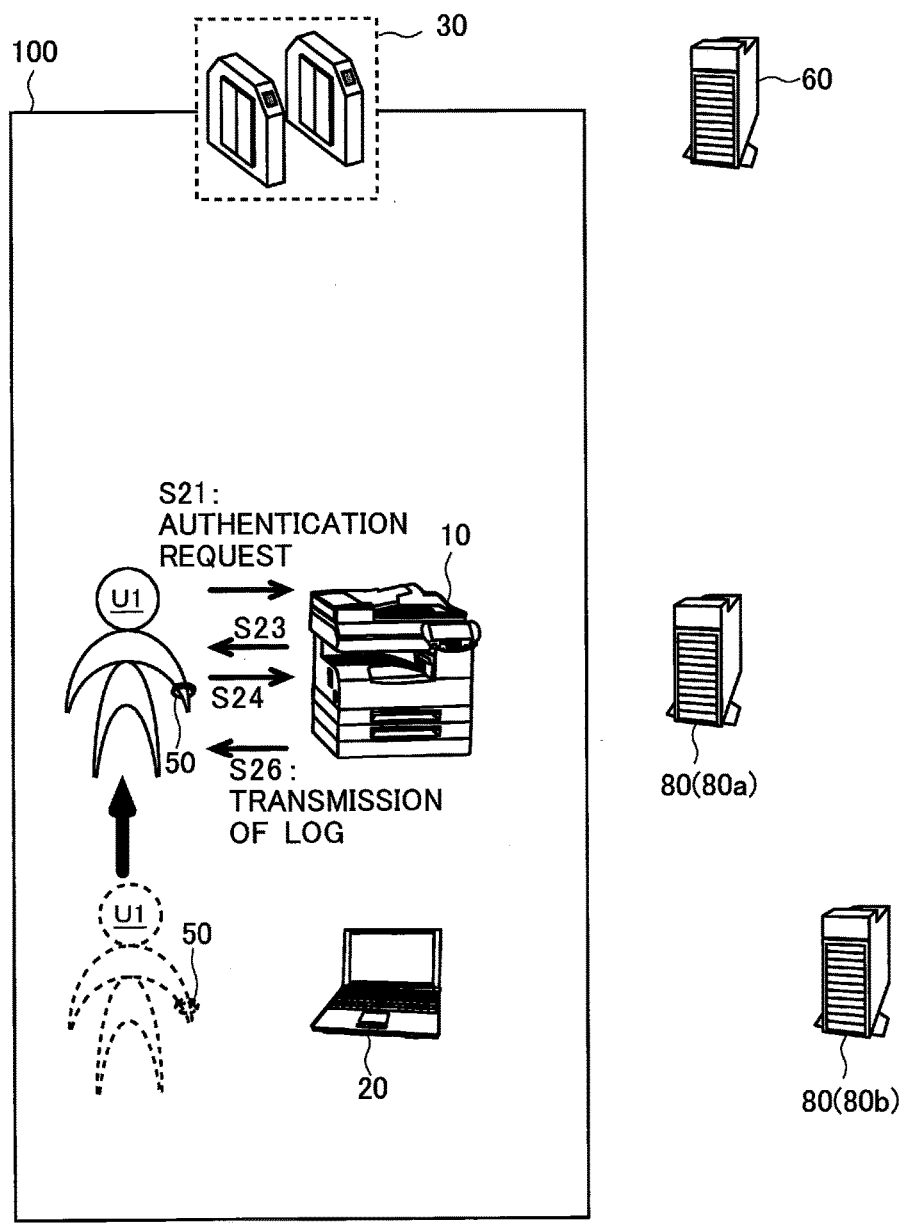

After that, the user U1 can use another information equipment (another MFP 10, one of the personal computers 20, and/or the like) in the same manner (see FIG. 19). Further, the user U1 can use the first MFP 10 again (see FIG. 20). Further, when the user U1 uses the personal computer 20, the personal computer 20 performs communication with the personal identification apparatus 50 (instead of the information equipment management server 80 (80b)) and uses the use approval/disapproval information inside the personal identification apparatus 50, to thereby acquire the determination result on the approval or disapproval of use of the personal computer 20.

In these cases (also in the second use of the same MFP 10), since the use approval/disapproval information is already stored in the personal identification apparatus 50, the acquisition process of the use approval/disapproval information (Steps S45, S46, and the like) is not performed but the same operations as those in Step S21 on the lower side of FIG. 23 and the following steps are performed.

<Operation on Exit from Room>

Next, description will be made on an operation at the time when the user U1 exits the room 100 (see FIG. 21).

After using the information equipment inside the room 100, the user U1 goes through the room entrance/exit management apparatus 30 and exits the room 100. When the user U1 exits the room 100, the following operation is performed (see FIG. 24 and the like). Further, FIG. 24 is a view showing the operation of the information equipment management system 1, in accordance with the second preferred embodiment, at the time when the user U1 exits the room.

First, when the user U1 goes through the room entrance/exit management apparatus 30 and exits the room, the personal identification apparatus 50 of the user U1 deletes all the use approval/disapproval information (respective use approval/disapproval information of the information equipments) which are temporarily stored in the storage part inside the self-apparatus 50 from the personal identification apparatus 50.

Then, the personal identification apparatus 50 returns the management authority of the information equipments to the information equipment management servers 80. Specifically, the personal identification apparatus 50 transmits the return notification of the management authority to the information equipment management servers 80 via the room entrance/exit management apparatus 30 and the information equipment management server 80a (the server which performed a consolidation process (acquisition process) of the use approval/disapproval information (see Steps S61 and S62)). In detail, after the personal identification apparatus 50 transmits the return notification to the room entrance/exit management apparatus 30 (Step S91), the room entrance/ exit management apparatus 30 transmits the return notification to the information equipment management server 80*a* (Step S92). Furthermore, the information equipment management server 80*a* transmits the return notification to another information equipment management server 80*b* (Step S93). Further, the information equipment management servers 80 (80*a* and 80*b*) transmit the return notification to the corresponding information equipments (Step S94). In detail, the information equipment management server 80*a* transmits the return notification to the plurality of MFPs 10 and the information equipment management server 80*b* transmits the return notification to the plurality of personal computers 20.

Further, the use history information (the use history information of the information equipments) stored inside the personal identification apparatus 50 are also transmitted to the information equipment management servers 80 together with the return notification (through the same channel). For example, the use history information of the MFP 10*a* is transmitted to the information equipment management server 80*a* and the use history information of the personal computer 20 is transmitted to the information equipment management server 80*b*.

Furthermore, in a case where the use approval/disapproval information are moved from the information equipment management servers 80 to the personal identification apparatus 50 (the use approval/disapproval information are once deleted from the information equipment management servers 80), the use approval/disapproval information themselves deleted from the personal identification apparatus 50 may be transmitted (returned) (together with the return notification or the like) to the information equipment management servers 80. Further, in a case where the usage amount limitation information in the use approval/disapproval information is updated, it is preferable that the updated usage amount limitation information (for example, information on the reduced number of remaining printable sheets ("100" pieces left, or the like)) should be transmitted to the information equipment management servers 80. The information equipment management servers 80 may store and manage the received use approval/disapproval information into the information equipment management server 80*a* as the updated (latest) use approval/disapproval information.

Thus, the alternative management by the personal identification apparatus 50 is ended.

<2-6. Effects, Etc. of the Second Preferred Embodiment>

Thus, also in the second preferred embodiment, the same effects as those in the first preferred embodiment can be produced.

The second preferred embodiment, however, is different from the first preferred embodiment in that the use approval/disapproval information is acquired into the personal identification apparatus 50 at the point in time of performing the authentication operation of the information equipment to which the first access is made (in the above exemplary case, the MFP 10). It is preferable that the second preferred embodiment should be applied to a case, for example, where the users frequently enter the room 100 and exit the room 100 without any use of the information equipments, or the like. This is because the process can proceed without performing the operation of transmitting the use approval/disapproval information to the personal identification apparatus 50 in most cases.

<Variations of the Second Preferred Embodiment>

Further, though the return notification and the like are transmitted to the information equipment management server 80*b* via the information equipment management server 80*a* (hierarchically) in the above-described second preferred embodiment, this is only one exemplary case, and the room entrance/exit management apparatus 30 may directly transmit the return notification and the like to the information equipment management servers 80. For example, the room entrance/exit management apparatus 30 may directly transmit the return notification, the use approval/disapproval information, and the use history information to the information equipment management server 80*a* and may directly transmit the return notification, the use approval/disapproval information, and the use history information to the information equipment management server 80*b*.

Alternatively, like in the first preferred embodiment, the room entrance/exit management apparatus 30 may transmit the return notification and the like to the information equipment management servers 80 via the room entrance/exit management server 60.

Further, at the point in time when the user makes first access to an information equipment after the user enters the room 100, the respective use approval/disapproval information of the plurality of information equipments, which include not only the use approval/disapproval information of the above information equipment but also the respective use approval/disapproval information of the other information equipments, are acquired in the above-described second preferred embodiment, but this is only one exemplary case.

For example, at the point in time when the user makes first access to an information equipment after the user enters the room 100, only the use approval/disapproval information of the above information equipment may be acquired. Then, at the point in time when the user makes first access to another information equipment, the use approval/disapproval information of the (another) information equipment may be acquired. In other words, the use approval/disapproval information of each information equipment may be acquired at the point in time when the user makes first access to each of the plurality of information equipments inside the room 100.

Further, in the second preferred embodiment, each of the information equipments 10 and 20 uses the transfer notification and the return notification, as status information, which are received from the correspondig information equipment management server 80. In the second preferred embodiment, the transfer notification and the return notification received from the corresponding information equipment management server 80 are not used as a direct determination element on whether the use approval/disapproval information inside the personal identification apparatus 50 or the use approval/disapproval information inside the information equipment management server 80 should be used. In other words, when the use approval/disapproval information is stored in the personal identification apparatus 50 and the wearing of the personal identification apparatus 50 continues, the use approval/disapproval information inside the personal identification apparatus 50 is always used, regardless of whether the transfer notification and the return notification have been received or not. The present invention, however, is not limited to the case. Like in the first preferred embodiment, for example, there may be a case where when the transfer notification has been received, the use approval/disapproval information inside the personal identification apparatus 50 is used to determine the approval or disapproval of use of the information equipments, and when the transfer notification has not been received, the use approval/disapproval information inside the information equipment management server 80 is used to determine the approval or disapproval of use of the information equipments. Further, there may be another case where when the return notification is received, the transfer notification is invalidated and the use approval/disapproval information inside the information equipment management server 80 is used to determine the approval or disapproval of use of the information equipments.

<3. Variations, Etc.>

Thus, though the preferred embodiments of the present invention have been described above, the present invention is not limited to the above described exemplary cases.

For example, though whether the management apparatus for the information equipments is the information equipment management server 80 or the personal identification apparatus 50 is determined on the basis of the transfer notification and the like in the above-described first preferred embodiment and the like, this is only one exemplary case. Specifically, each information equipment makes an inquiry or the like on whether the use approval/disapproval information is stored or not to the personal identification apparatus 50, and it may be thereby determined, on the basis of the inquiry result, whether the management apparatus for the information equipment is the information equipment management server 80 or the personal identification apparatus 50.

Further, though the use approval/disapproval information inside the personal identification apparatus 50 is used on the condition that the removal of the personal identification apparatus 50 is not detected (see Step S22 (FIG. 14) and Step S28 (FIG. 25)) in the above-described preferred embodiments, this is only one exemplary case, and whether the removal of the personal identification apparatus 50 is detected or not may not be taken into consideration. For example, in the first preferred embodiment, only on the condition that the use approval/disapproval information is stored in the personal identification apparatus 50, the process may go from Step S22 to Step S23. Alternatively, in the second preferred embodiment, there may be a case where the branch process in Step S28 is not performed and the processes in Step S23 and the following steps are always performed. From the viewpoint of ensuring the security (personal authentication), it is preferable that whether the removal of the personal identification apparatus 50 is detected or not should be taken into consideration, like in the above-described preferred embodiments.

<Other Timings of Deleting Use Approval/Disapproval Information>

Further, though the use approval/disapproval information for the user U1 is deleted from the personal identification apparatus 50 on the exit of the user U1 from the room (when the user U1 exits the room 100) in the above-described preferred embodiments, this is only one exemplary case. For example, there may be a case where the use approval/disapproval information for the user U1 is deleted from the personal identification apparatus 50 when the user U1 leaves a company office building (at the point in time when the user U1 goes through a security gate provided outside the room 100).

Thus, the use approval/disapproval information and the like for the user U1 may be deleted from the personal identification apparatus 50 when the user U1 leaves a predetermined space (room or company office site).

Alternatively, the use approval/disapproval information may be deleted from the personal identification apparatus 50 at another timing other than the timing of leaving the predetermined space.

For example, the use approval/disapproval information may be deleted from the personal identification apparatus 50 when a predetermined time (for example, 10 hours) has elapsed (the predetermined time has elapsed) from the point in time when the use approval/disapproval information was transferred from the information equipment management servers 80 to the personal identification apparatus 50.

Further, the use approval/disapproval information may be deleted from the personal identification apparatus 50 when the number of failures in the authentication operation using the use approval/disapproval information inside the personal identification apparatus 50 reaches a predetermined number. Specifically, it is first assumed that there is a situation in which the authentication operation is repeated. For example, it is assumed that when the authentication request is transmitted from the personal identification apparatus 50 to the MFP 10 in a state (non-wearing state) in which the user U1 does not wear the personal identification apparatus 50 in Step S22 (or S28), the process does not directly go to Step S33 but an alarm indicating that the authentication operation should be performed again after wearing the personal identification apparatus 50 is displayed and the authentication operation can be received again. Then, in such a case, when the number of failures in the authentication operation reaches a predetermined number (for example, three times), the use approval/disapproval information may be deleted from the personal identification apparatus 50 and the processes in Steps S33 to S36 may be performed. Further, it is preferable that in Step S33, S34, and the like, the security should be ensured by causing the user to input (again) a user ID and a password.

Furthermore, as the situation in which the authentication operation is repeated, the following situation can be caused. Specifically, the personal identification apparatus 50 deletes or invalidates the use approval/disapproval information inside the personal identification apparatus 50 with the passage of a predetermined time (or outing). It is assumed that when the authentication request is received in such a situation, the process does not directly go to Step S33 but the authentication operation can be received again for precautionary purposes. In such a situation, when the number of failures in the authentication operation reaches the predetermined number, or the like, the use approval/disapproval information may be deleted from the personal identification apparatus 50.

<Other Timings of Transferring Use History Information>

Further, in the above-described preferred embodiments, the personal identification apparatus 50 temporarily stores therein the use history information on the information equipment during the alternative management (time period while the approval or disapproval of use of the information equipments is alternatively managed by the personal identification apparatus 50, instead of the information equipment management server 80). Then, when the user U1 exits the room 100 (when the alternative management is ended), the personal identification apparatus 50 transmits the use history information during the alternative management to the information equipment management server 80 and causes the information equipment management server 80 to store (manage) the use history information therein. This is, however, only one exemplary case.

For example, the personal identification apparatus 50 may transmit, and so on, the use history information during the alternative management to the information equipment management server 80 when any other alternative management is ended, specifically when the user U1 leaves the company office building (when the user U1 goes out through an entrance/exit gate of the company office building, or the like), not when the user U1 exits the room.

Alternatively, the personal identification apparatus 50 may transmit, and so on, the use history information during the alternative management to the information equipment management server 80 when a predetermined time has elapsed (or every time when a predetermined time has elapsed).

Further, when the use approval/disapproval information is acquired and then the number of failures in the authentication operation using the use approval/disapproval information reaches a predetermined number, the personal identification apparatus 50 (may delete or invalidate the use approval/disapproval information and) may transmit, and so on, the use history information during the alternative management to the information equipment management server 80.

Furthermore, the use history information of the information equipments may be transmitted to the information equipment management servers 80 at another timing other than the timing of deleting the use approval/disapproval information of the information equipments (at the return of the management authority) or the like. For example, while the use approval/disapproval information of the information equipments are deleted from the personal identification apparatus 50 when the user U1 leaves the company office building (when the user U1 goes out through an entrance/exit gate of the company office building, or the like), the use history information of the information equipments may be transmitted, and so on, to the information equipment management server 80 when the user U1 exits the room. It is thereby possible to more reliably avoid loss of the use history information.

<Non-Deletion and Encryption, etc. of Use Approval/Disapproval Information on Exit from Room>

Further, though the use approval/disapproval information is deleted from the personal identification apparatus 50 when the user U1 exits the room in the above-described preferred embodiments, this is only one exemplary case.

For example, in consideration that the user U1 momentarily exits the room and then enters the room again (reenters the room), and so on, the use approval/disapproval information may not be immediately deleted from the personal identification apparatus 50 when the user U1 exits the room. It is thereby possible to avoid an increase in the communication load due to frequent transmission/reception of the use approval/disapproval information particularly in a case where the user frequently repeats the entrance and exit.

Further, in this case, it is preferable that the use approval/disapproval information inside the personal identification apparatus 50 should be encrypted (concealed) during outing. For example, when the user exits the room 100, the personal identification apparatus 50 may encrypt the use approval/disapproval information inside the personal identification apparatus 50. Furthermore, key information (decoding key) for encryption release (decoding) may be stored in the room entrance/exit management apparatus 30. Then, when the user U1 reenters the room 100, the personal identification apparatus 50 may acquire the decoding key from the room entrance/exit management apparatus 30 and decode the use approval/disapproval information stored, being encrypted, in the personal identification apparatus 50 by using the decoding key. It is thereby possible to prevent the use approval/disapproval information from being peeped by a third party during outing and to reduce the frequency of writing the use approval/disapproval information.

<Others>

Further, though the management of the information equipments inside the room 100 is performed in cooperation with the room entrance/exit management apparatus 30 and the like in the above-described preferred embodiments, this is only one exemplary case. For example, independently of the entrance of the user U1 into the room 100, the personal identification apparatus 50 of the user U1 may acquire the use approval/disapproval information of one information equipment from the information equipment management server 80 which is an original management apparatus of the use approval/disapproval information and (temporarily) store therein the use approval/disapproval information. Then, the personal identification apparatus 50 may use the use approval/disapproval information stored therein, to thereby control the operation of the information equipment, on behalf of the information equipment management server 80. In short, the personal identification apparatus 50 may alternatively perform the management function of the information equipment management server 80, independently of the entrance and exit of the user U1.

While the invention has been shown and described in detail, the foregoing description is in all aspects illustrative and not restrictive. It is therefore understood that numerous modifications and variations can be devised without departing from the scope of the invention.

What is claimed is:

1. An information equipment management system, comprising:
    a personal identification apparatus which is portable and configured to acquire biometric information of a carrying person thereof to identify said carrying person;
    an information equipment; and
    an information equipment management server for managing use approval/disapproval information which is management information on approval or disapproval of use of said information equipment,
    wherein said personal identification apparatus comprises:
    an acquisition part for acquiring use approval/disapproval information of said information equipment relating to said carrying person, which is use approval/disapproval information managed by said information equipment management server, from said information equipment management server; and
    a storage part for storing therein said use approval/disapproval information acquired from said information equipment management server, and wherein said information equipment controls an operation of said information equipment by using said use approval/disapproval information previously stored in said storage part of said personal identification apparatus.

2. The information equipment management system according to claim 1, wherein
    said personal identification apparatus invalidates said use approval/disapproval information stored in said personal identification apparatus when said personal identification apparatus determines that said carrying person does not wear said personal identification apparatus.

3. The information equipment management system according to claim 1, wherein
    said personal identification apparatus deletes said use approval/disapproval information from said personal identification apparatus when an alternative management of said use approval/disapproval information by said personal identification apparatus is ended, when said carrying person exits a predetermined space, when a predetermined time has elapsed since acquisition of said use approval/disapproval information, or when the number of failures in an authentication operation using said use approval/disapproval information reaches a predetermined number after acquisition of said use approval/disapproval information.

4. The information equipment management system according to claim 1, wherein
said personal identification apparatus temporarily stores therein use history information relating to said information equipment during an alternative management of said use approval/disapproval information by said personal identification apparatus, and
transmits said use history information during said alternative management to said information equipment management server when said alternative management is ended, when said carrying person exits a predetermined space, when a predetermined time has elapsed since acquisition of said use approval/disapproval information, or when the number of failures in an authentication operation using said use approval/disapproval information reaches a predetermined number after acquisition of said use approval/disapproval information.

5. The information equipment management system according to claim 1, further comprising:
a room entrance/exit management apparatus for managing entrance and exit relating to a predetermined room,
wherein said personal identification apparatus acquires said use approval/disapproval information of said information equipment disposed inside said predetermined room, which is use approval/disapproval information for a user whose entrance into said predetermined room is confirmed by said room entrance/exit management apparatus, from said information equipment management server.

6. The information equipment management system according to claim 1, further comprising:
a room entrance/exit management apparatus for managing entrance and exit relating to a predetermined room; and
a room entrance/exit management server for managing said room entrance/exit management apparatus,
wherein said personal identification apparatus acquires said use approval/disapproval information of said information equipment disposed inside said predetermined room, from said information equipment management server via said room entrance/exit management apparatus and said room entrance/exit management server, when said personal identification apparatus makes access to said room entrance/exit management apparatus as said carrying person of said personal identification apparatus enters said predetermined room.

7. The information equipment management system according to claim 6, wherein
said personal identification apparatus deletes said use approval/disapproval information of said information equipment from said personal identification apparatus when said personal identification apparatus makes access to said room entrance/exit management apparatus as said carrying person of said personal identification apparatus exits said predetermined room.

8. The information equipment management system according to claim 6, wherein
said personal identification apparatus encrypts said use approval/disapproval information stored in said storage part on exiting said predetermined room, and
said personal identification apparatus decodes said use approval/disapproval information which is stored, being encrypted, in said storage part, on reentering said predetermined room.

9. The information equipment management system according to claim 1, wherein
said personal identification apparatus acquires said use approval/disapproval information of said information equipment from said information equipment management server via said information equipment when said personal identification apparatus makes first access to said information equipment after a predetermined point in time.

10. The information equipment management system according to claim 1, further comprising:
another information equipment other than said information equipment; and
another information equipment management server other than said information equipment management server,
wherein a plurality of information equipment management servers including said information equipment management server and said another information equipment management server manage respective use approval/disapproval information which are management information on approval or disapproval of respective uses of a plurality of information equipments including said information equipment and said another information equipment,
said acquisition part acquires respective use approval/disapproval information relating to said plurality of information equipments from said plurality of information equipment management servers, respectively,
said storage part stores therein said respective use approval/disapproval information acquired from said plurality of information equipment management servers, and
at a timing of using specific use approval/disapproval information corresponding to a specific information equipment among said plurality of information equipments, said information equipment controls an operation of said specific information equipment by using said specific use approval/disapproval information stored in said storage part of said personal identification apparatus, instead of said specific use approval/disapproval information inside a specific information equipment management server corresponding to said specific information equipment.

11. The information equipment management system according to claim 10, further comprising:
a room entrance/exit management apparatus for managing entrance and exit relating to a predetermined room; and
a room entrance/exit management server for managing said room entrance/exit management apparatus,
wherein said room entrance/exit management server collects said respective use approval/disapproval information from said plurality of information equipment management servers, and
said personal identification apparatus acquires respective use approval/disapproval information of said plurality of information equipments disposed inside said predetermined room, from said information equipment management server via said room entrance/exit management apparatus and said room entrance/exit management server, when said personal identification apparatus makes access to said room entrance/exit management apparatus as said carrying person of said personal identification apparatus enters said predetermined room.

12. The information equipment management system according to claim 11, wherein
said personal identification apparatus notifies said plurality of information equipment management servers via said room entrance/exit management server, respectively, of end of alternative management relating to said respective use approval/disapproval information, when said alternative management of said respective use approval/disapproval information by said personal identification apparatus is ended.

13. The information equipment management system according to claim 10, wherein
said personal identification apparatus acquires said respective use approval/disapproval information from a first information equipment management server among said plurality of information equipment management servers, corresponding to a first information equipment to which a user of said personal identification apparatus makes first access after a predetermined point in time.

14. The information equipment management system according to claim 13, wherein
when said alternative management of said respective use approval/disapproval information by said personal identification apparatus is ended, said personal identification apparatus notifies said first information equipment management server of end of alternative management relating to said respective use approval/disapproval information and also notifies information equipment management servers other than said first information equipment management server among said plurality of information equipment management servers, of end of said alternative management, via said first information equipment management server.

15. The information equipment management system according to claim 1, wherein
said information equipment makes access to said personal identification apparatus via wireless communication with said personal identification apparatus, and
said information equipment controls an operation of said information equipment by said carrying person of said personal identification apparatus by using said use approval/disapproval information stored in said storage part of said personal identification apparatus.

16. The information equipment management system according to claim 1, wherein
said use approval/disapproval information includes authentication information of said information equipment.

17. The information equipment management system according to claim 1, wherein
said use approval/disapproval information includes secondary information which is information used to determine secondary approval or disapproval of use of said information equipment after an authentication process which is a process to determine primary approval or disapproval of use of said information equipment.

18. The information equipment management system according to claim 17, wherein
said secondary information includes information on approval or disapproval of use of each function of said information equipment.

19. The information equipment management system according to claim 17, wherein
said secondary information includes information on limitation of the amount of usage of said information equipment.

20. The information equipment management system according to claim 1, wherein said personal identification apparatus determines approval or disapproval on the basis of the use approval/disapproval information stored in the personal identification apparatus.

* * * * *